US012100300B2

(12) United States Patent
James et al.

(10) Patent No.: US 12,100,300 B2
(45) Date of Patent: Sep. 24, 2024

(54) SYSTEM AND METHOD FOR INTERSECTION COLLISION AVOIDANCE

(71) Applicant: Nissan North America, Inc., Franklin, TN (US)

(72) Inventors: Viju James, Fremont, CA (US); Liam Pedersen, San Francisco, CA (US); Najamuddin Mirza Baig, San Jose, CA (US); Fang-Chieh Chou, Sunnyvale, CA (US); Simon Tien, Santa Clara, CA (US)

(73) Assignee: Nissan North America, Inc., Franklin, TN (US)

( * ) Notice: Subject to any disclaimer, the term of this patent is extended or adjusted under 35 U.S.C. 154(b) by 247 days.

(21) Appl. No.: 17/705,996

(22) Filed: Mar. 28, 2022

(65) Prior Publication Data

US 2023/0245564 A1  Aug. 3, 2023

Related U.S. Application Data

(60) Provisional application No. 63/304,879, filed on Jan. 31, 2022.

(51) Int. Cl.
  *G08G 1/16* (2006.01)
  *G08G 1/01* (2006.01)
  *H04W 4/44* (2018.01)

(52) U.S. Cl.
  CPC .......... *G08G 1/164* (2013.01); *G08G 1/0116* (2013.01); *G08G 1/166* (2013.01); *H04W 4/44* (2018.02)

(58) Field of Classification Search
  CPC ...... G08G 1/0116; G08G 1/164; G08G 1/166; H04W 4/40; H04W 4/44
  See application file for complete search history.

(56) References Cited

U.S. PATENT DOCUMENTS

| 6,246,932 | B1  |   | 6/2001  | Kageyama et al. |
|-----------|-----|---|---------|-----------------|
| 10,810,880| B1  | * | 10/2020 | Schweitzer .......... G08G 1/0133 |
| 11,386,787| B2  | * | 7/2022  | Schweitzer .......... G08G 1/0133 |
| 11,524,688| B2  |   | 12/2022 | Kato et al. |
| 11,727,810| B2  | * | 8/2023  | Schweitzer ...... G08G 1/096775 340/903 |

(Continued)

FOREIGN PATENT DOCUMENTS

JP      H09159474 A     6/1997

*Primary Examiner* — Tyler J Lee

(74) *Attorney, Agent, or Firm* — Young Basile Hanlon & MacFarlane, P.C.

(57) ABSTRACT

Intersection collision avoidance may use a cellular transceiver for a cellular network and a processor located at a cellular access point for multi-access edge computing. The processor includes a shared world model and a conflict detection module. The shared world model is configured to receive, by the cellular transceiver, signals relating to at least two road users in proximity to an intersection within a vehicle transportation network, wherein the at least two road users include an ego vehicle, and the signals conform to a standards-based communication protocol. The conflict detection module is configured to receive object information from the shared world model, determine a potential future collision between the ego vehicle and an other road user of the at least two road users, and transmit a notification of the potential future collision to the ego vehicle over the cellular network.

20 Claims, 11 Drawing Sheets

(56) References Cited

U.S. PATENT DOCUMENTS

| | | |
|---|---|---|
| 2015/0035685 A1 | 2/2015 | Strickland et al. |
| 2017/0046958 A1 | 2/2017 | Naka et al. |
| 2017/0151944 A1 | 6/2017 | Al-Stouhi |
| 2017/0316687 A1 | 11/2017 | Gross |
| 2019/0012912 A1 | 1/2019 | Kim et al. |
| 2021/0142676 A1* | 5/2021 | Schweitzer .......... G08G 1/0133 |
| 2021/0201664 A1 | 7/2021 | McQuillen et al. |
| 2021/0271249 A1 | 9/2021 | Kobashi et al. |
| 2021/0394705 A1 | 12/2021 | Kourous-Harrigan |
| 2022/0068120 A1* | 3/2022 | Alfano .................. G08G 1/093 |
| 2022/0319330 A1* | 10/2022 | Schweitzer ...... G08G 1/096775 |
| 2022/0343761 A1 | 10/2022 | Bandi et al. |
| 2023/0245564 A1 | 8/2023 | James et al. |

\* cited by examiner

SYSTEM AND METHOD FOR INTERSECTION COLLISION AVOIDANCE

CROSS-REFERENCE TO RELATED APPLICATION

This application claims priority to and the benefit of U.S. Provisional Patent Application No. 63/304,879, filed Jan. 31, 2022, which is incorporated herein in its entirety by reference.

TECHNICAL FIELD

This application relates to navigating intersections, and more particularly to a system and method for intersection collision avoidance.

BACKGROUND

Transportation network data from and related to the transportation network and users of and proximate to the transportation network is available from sensors on vehicles traversing the transportation network and from infrastructure sensors proximate to the transportation networks. For example, the transportation network data can be received or obtained from fixed infrastructure, such as traffic cameras and inductive-loop traffic sensors, self-reported locations, and state information from connected road users and connected vehicle-mounted sensors. Processing the collected transportation network data to provide meaningful insights into the behavior of road users is difficult.

SUMMARY

Disclosed herein are aspects, features, elements, and implementations for intersection collision avoidance.

An aspect of the disclosed implementations is a system for intersection collision avoidance that includes a cellular transceiver for a cellular network and a processor located at a cellular access point for multi-access edge computing. The processor includes (implements, processes, etc.) a shared world model configured to receive, by the cellular transceiver, signals relating to at least two road users in proximity to an intersection within a vehicle transportation network, wherein the at least two road users include an ego vehicle, and the signals conform to a standards-based communication protocol. The processor also includes a conflict detection module configured to receive object information from the shared world model, determine a potential future collision between the ego vehicle and an other road user of the at least two road users, and transmit a notification of the potential future collision to the ego vehicle over the cellular network.

An aspect of the disclosed implementations is a method for intersection collision avoidance that includes receiving, by a cellular transceiver for a cellular network, signals at a shared world model relating to at least two road users in proximity to an intersection within a vehicle transportation network, wherein the at least two road users include an ego vehicle, and the signals conform to a standards-based communication protocol, receiving object information from the shared world model at a conflict detection module, determining, by the conflict detection module, a potential future collision between the ego vehicle and an other road user of the at least two road users, and transmitting, by the conflict detection module. a notification of the potential future collision to the ego vehicle over the cellular network. The shared world model and the conflict detection module are implemented by a processor located at a cellular access point for multi-access edge computing.

These and other aspects of the present disclosure are disclosed in the following detailed description of the embodiments, the appended claims, and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings may not be to scale. On the contrary, the dimensions of the various features may be arbitrarily expanded or reduced for clarity. Further, like reference numbers refer to like elements throughout the drawings unless otherwise noted.

DETAILED DESCRIPTION

A vehicle may traverse a portion of a vehicle transportation network. The vehicle transportation network can include one or more unnavigable areas, such as a building; one or more partially navigable areas, such as a parking area (e.g., a parking lot, a parking space, etc.); one or more navigable areas, such as roads (which include lanes, medians, intersections, etc.); or a combination thereof. The vehicle may use its native sensors, which generate or capture data corresponding to an operational environment of the vehicle, or a portion thereof, while the vehicle traverses the vehicle transportation network. The vehicle may then use this data to identify potential collisions or hazards (e.g., other road users), which can be used for notifications to an operator, for input to safety systems, for input into advanced driver-assistance systems (ADAS), or some combination thereof.

As mentioned above, other data is available for the purpose of identifying potential collisions or hazards. Processing the collected transportation network data from the vehicle sensors and from other vehicles and infrastructure sensors is complicated by its large volume. A large volume of data tends to increase latency in providing insights into the future behavior. Moreover, the data regarding a single road user (e.g., from different sources) can be inconsistent or contradictory at any given point in time. A large volume of data can also result in unneeded notifications to a particular road user, such as a vehicle of interest, also referred to as an ego vehicle. These issues are particularly acute when an ego vehicle is approaching or within an intersection, which is the most complex and hazardous area of a transportation network.

Various solutions described herein improve operation of an ego vehicle approaching, navigating, etc., an intersection that reduces latency over conventional techniques for processing date, resolves road user data from different sources, effectively targets road users for notifications to avoid collisions, or combinations thereof. To describe some implementations of the intersection collision avoidance according to the teachings herein in greater detail, reference is first made to the environment in which this disclosure may be implemented.

Figure 1:
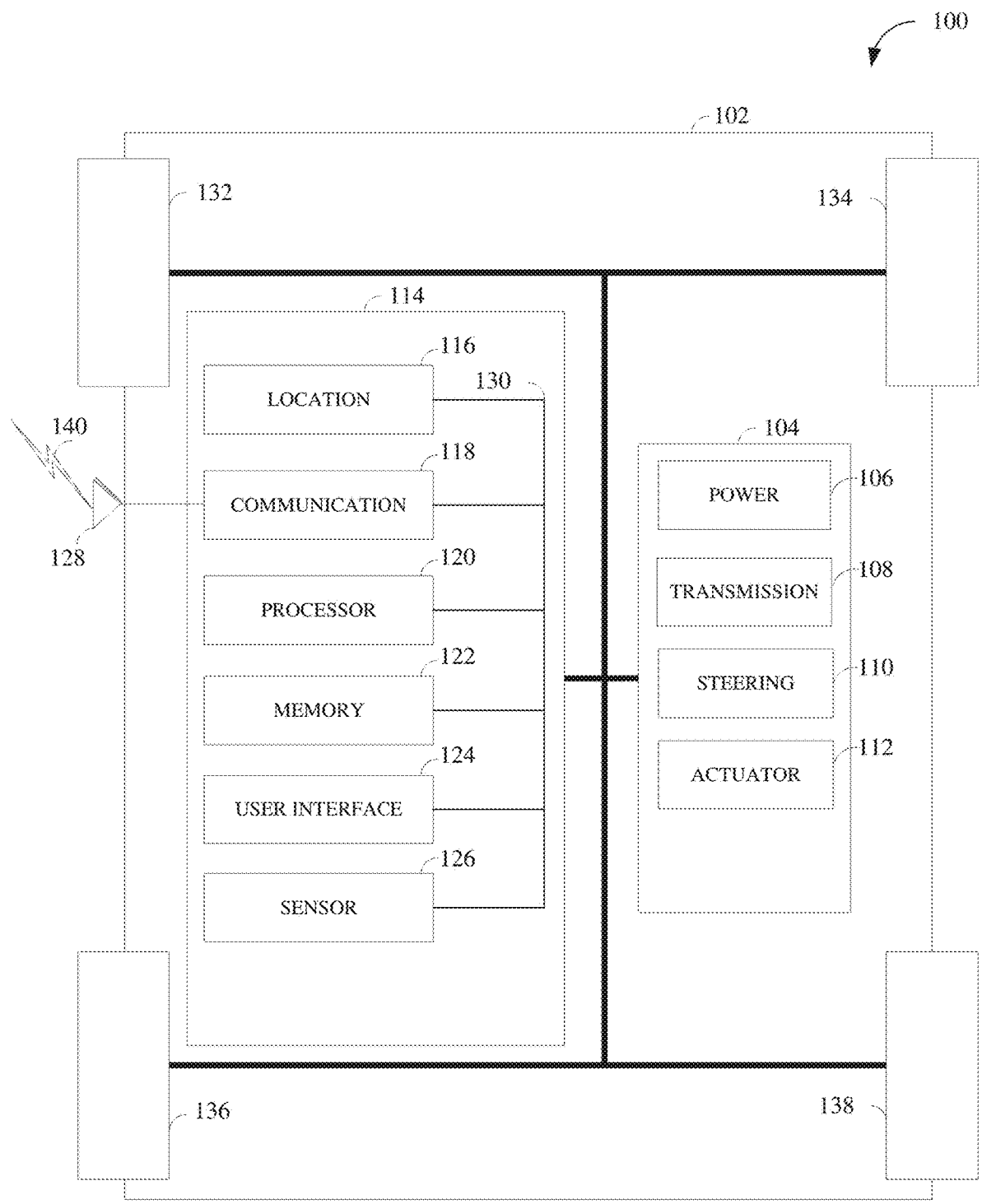
FIG. 1 is a diagram of an example of a portion of a vehicle in which the aspects, features, and elements disclosed herein may be implemented.

FIG. 1 is a diagram of an example of a portion of a vehicle 100 in which the aspects, features, and elements disclosed herein may be implemented. The vehicle 100 includes a chassis 102, a powertrain 104, a controller 114, wheels 132/134/136/138, and may include any other element or combination of elements of a vehicle. Although the vehicle 100 is shown as including four wheels 132/134/136/138 for simplicity, any other propulsion device or devices, such as a propeller or tread, may be used. In FIG. 1, the lines interconnecting elements, such as the powertrain 104, the controller 114, and the wheels 132/134/136/138, indicate that information, such as data or control signals; power, such as electrical power or torque; or both information and power may be communicated between the respective elements. For example, the controller 114 may receive power from the powertrain 104 and communicate with the powertrain 104, the wheels 132/134/136/138, or both, to control the vehicle 100, which can include accelerating, decelerating, steering, or otherwise controlling the vehicle 100.

The powertrain 104 includes a power source 106, a transmission 108, a steering unit 110, a vehicle actuator 112, and may include any other element or combination of elements of a powertrain, such as a suspension, a drive shaft, axles, or an exhaust system. Although shown separately, the wheels 132/134/136/138 may be included in the powertrain 104.

The power source 106 may be any device or combination of devices operative to provide energy, such as electrical energy, thermal energy, or kinetic energy. For example, the power source 106 includes an engine, such as an internal combustion engine, an electric motor, or a combination of an internal combustion engine and an electric motor and is operative (or configured) to provide kinetic energy as a motive force to one or more of the wheels 132/134/136/138. In some embodiments, the power source 106 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 108 receives energy, such as kinetic energy, from the power source 106 and transmits the energy to the wheels 132/134/136/138 to provide a motive force. The transmission 108 may be controlled by the controller 114, the vehicle actuator 112, or both. The steering unit 110 may be controlled by the controller 114, the vehicle actuator 112, or both and controls the wheels 132/134/136/138 to steer the vehicle. The vehicle actuator 112 may receive signals from the controller 114 and may actuate or control the power source 106, the transmission 108, the steering unit 110, or any combination thereof to operate the vehicle 100.

In the illustrated embodiment, the controller 114 includes a location unit 116, an electronic communication unit 118, a processor 120, a memory 122, a user interface 124, a sensor 126, and an electronic communication interface 128. Although shown as a single unit, any one or more elements of the controller 114 may be integrated into any number of separate physical units. For example, the user interface 124 and the processor 120 may be integrated in a first physical unit, and the memory 122 may be integrated in a second physical unit. Although not shown in FIG. 1, the controller 114 may include a power source, such as a battery. Although shown as separate elements, the location unit 116, the electronic communication unit 118, the processor 120, the memory 122, the user interface 124, the sensor 126, the electronic communication interface 128, or any combination thereof can be integrated in one or more electronic units, circuits, or chips.

In some embodiments, the processor 120 includes any device or combination of devices, now-existing or hereafter developed, capable of manipulating or processing a signal or other information, for example optical processors, quantum processors, molecular processors, or a combination thereof. For example, the processor 120 may include one or more special-purpose processors, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, one or more state machines, or any combination thereof. The processor 120 may be operatively coupled with the location unit 116, the memory 122, the electronic communication interface 128, the electronic communication unit 118, the user interface 124, the sensor 126, the powertrain 104, or any combination thereof. For example, the processor may be operatively coupled with the memory 122 via a communication bus 130.

The processor 120 may be configured to execute instructions. Such instructions may include instructions for remote operation, which may be used to operate the vehicle 100 from a remote location, including the operations center. The instructions for remote operation may be stored in the vehicle 100 or received from an external source, such as a traffic management center, or server computing devices, which may include cloud-based server computing devices. The processor 120 may also implement some or all of the proactive risk mitigation described herein.

The memory 122 may include any tangible non-transitory computer-usable or computer-readable medium capable of, for example, containing, storing, communicating, or transporting machine-readable instructions or any information associated therewith, for use by or in connection with the processor 120. The memory 122 may include, for example, one or more solid state drives, one or more memory cards, one or more removable media, one or more read-only memories (ROM), one or more random-access memories (RAM), one or more registers, one or more low power double data rate (LPDDR) memories, one or more cache memories, one or more disks (including a hard disk, a floppy disk, or an optical disk), a magnetic or optical card, or any type of non-transitory media suitable for storing electronic information, or any combination thereof.

The electronic communication interface 128 may be a wireless antenna, as shown, a wired communication port, an optical communication port, or any other wired or wireless unit capable of interfacing with a wired or wireless electronic communication medium 140.

The electronic communication unit 118 may be configured to transmit or receive signals via the wired or wireless electronic communication medium 140, such as via the electronic communication interface 128. Although not explicitly shown in FIG. 1, the electronic communication unit 118 is configured to transmit, receive, or both via any wired or wireless communication medium, such as radio frequency (RF), ultraviolet (UV), visible light, fiber optic, wire line, or a combination thereof. Although FIG. 1 shows a single electronic communication unit 118 and a single electronic communication interface 128, any number of communication units and any number of communication interfaces may be used. In some embodiments, the electronic communication unit 118 can include a dedicated short-range communications (DSRC) unit, a wireless safety unit (WSU), Institute of Electrical and Electronics Engineers (IEEE) 802.11p (WiFi-P), or a combination thereof.

The location unit 116 may determine geolocation information, including but not limited to longitude, latitude, elevation, direction of travel, or speed, of the vehicle 100. For example, the location unit includes a global positioning system (GPS) unit, such as a Wide Area Augmentation System (WAAS) enabled National Marine Electronics Association (NMEA) unit, a radio triangulation unit, or a combination thereof. The location unit 116 can be used to obtain information that represents, for example, a current heading of the vehicle 100, a current position of the vehicle 100 in two or three dimensions, a current angular orientation of the vehicle 100, or a combination thereof.

The user interface 124 may include any unit capable of being used as an interface by a person, including any of a virtual keypad, a physical keypad, a touchpad, a display, a touchscreen, a speaker, a microphone, a video camera, a sensor, and a printer. The user interface 124 may be operatively coupled with the processor 120, as shown, or with any other element of the controller 114. Although shown as a single unit, the user interface 124 can include one or more physical units. For example, the user interface 124 includes an audio interface for performing audio communication with a person, and a touch display for performing visual and touch-based communication with the person.

The sensor 126 may include one or more sensors, such as an array of sensors, which may be operable to provide information that may be used to control the vehicle. The sensor 126 can provide information regarding current operating characteristics of the vehicle or its surroundings. The sensor 126 includes, for example, a speed sensor, acceleration sensors, a steering angle sensor, traction-related sensors, braking-related sensors, or any sensor, or combination of sensors, that is operable to report information regarding some aspect of the current dynamic situation of the vehicle 100.

In some embodiments, the sensor 126 includes sensors that are operable to obtain information regarding the physical environment surrounding the vehicle 100. For example, one or more sensors detect road geometry and obstacles, such as fixed obstacles, vehicles, cyclists, and pedestrians. The sensor 126 can be or include one or more video cameras, laser-sensing systems, infrared-sensing systems, acoustic-sensing systems, or any other suitable type of on-vehicle environmental sensing device, or combination of devices, now known or later developed. The sensor 126 and the location unit 116 may be combined.

Although not shown separately, the vehicle 100 may include a trajectory controller. For example, the controller 114 may include a trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller outputs signals operable to control the vehicle 100 such that the vehicle 100 follows the trajectory that is determined by the trajectory controller. For example, the output of the trajectory controller can be an optimized trajectory that may be supplied to the powertrain 104, the wheels 132/134/136/138, or both. The optimized trajectory can be a control input, such as a set of steering angles, with each steering angle corresponding to a point in time or a position. The optimized trajectory can be one or more paths, lines, curves, or a combination thereof.

One or more of the wheels 132/134/136/138 may be a steered wheel, which is pivoted to a steering angle under control of the steering unit 110; a propelled wheel, which is torqued to propel the vehicle 100 under control of the transmission 108; or a steered and propelled wheel that steers and propels the vehicle 100.

A vehicle may include units or elements not shown in FIG. 1, such as an enclosure, a Bluetooth® module, a frequency modulated (FM) radio unit, a Near-Field Communication (NFC) module, a liquid crystal display (LCD) display unit, an organic light-emitting diode (OLED) display unit, a speaker, or any combination thereof.

The vehicle, such as the vehicle 100, may be an autonomous vehicle or a semi-autonomous vehicle. For example, as used herein, an autonomous vehicle as used herein should be understood to encompass a vehicle that includes an advanced driver assist system (ADAS). An ADAS can automate, adapt, and/or enhance vehicle systems for safety and better driving such as by circumventing or otherwise correcting driver errors.

Figure 2:
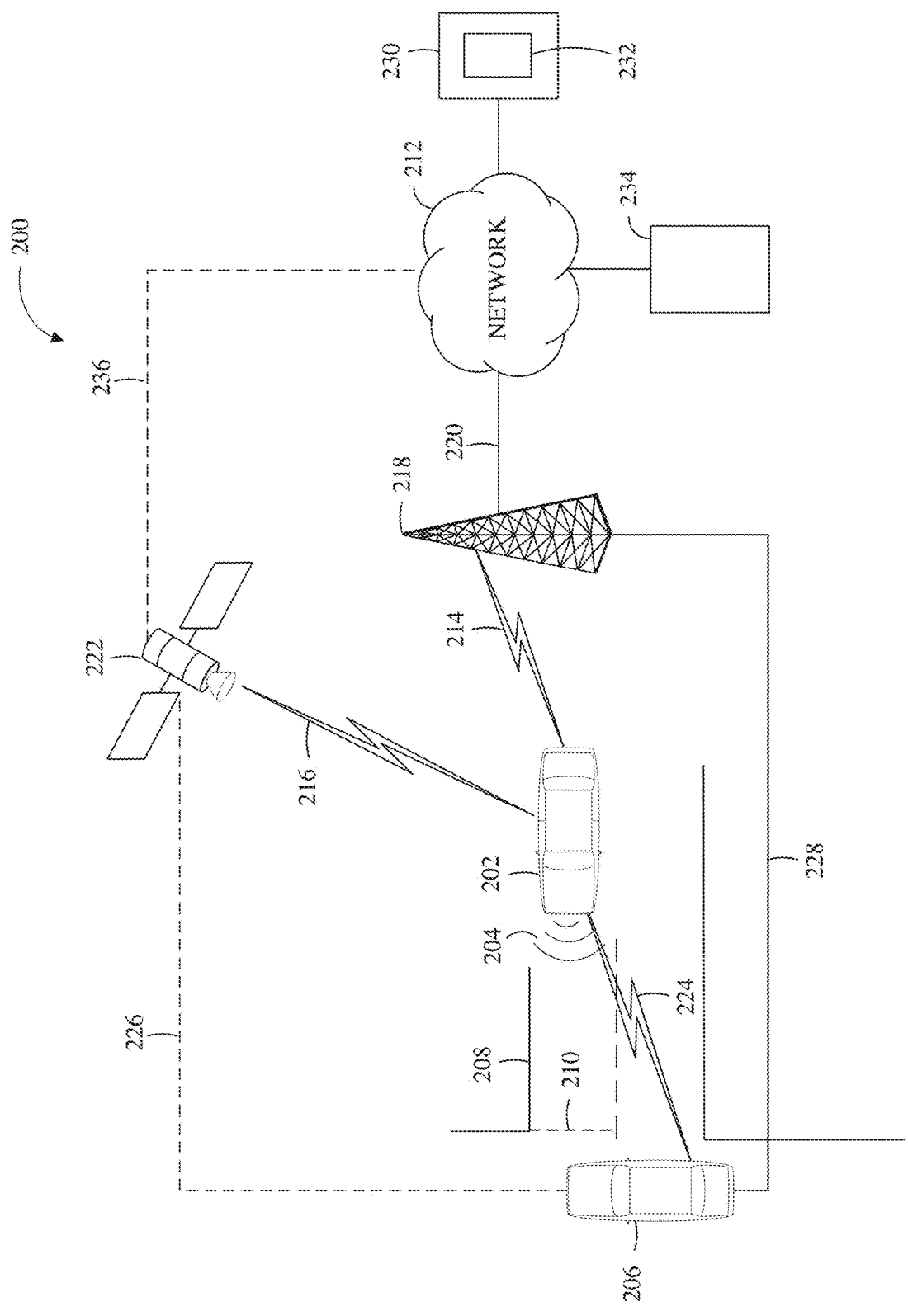
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 200 in which the aspects, features, and elements disclosed herein may be implemented. The vehicle transportation and communication system 200 includes a vehicle 202, such as the vehicle 100 shown in FIG. 1, and one or more external objects, such as an external object 206, which can include any form of transportation, such as the vehicle 100 shown in FIG. 1, a pedestrian, cyclist, as well as any form of a structure, such as a building. The vehicle 202 may travel via one or more portions of a transportation network 208, and may communicate with the external object 206 via one or more of an electronic communication network 212. Although not explicitly shown in FIG. 2, a vehicle may traverse an area that is not expressly or completely included in a transportation network, such as an off-road area. In some embodiments, the transportation network 208 may include one or more of a vehicle detection sensor 210, such as an inductive loop sensor, which may be used to detect the movement of vehicles on the transportation network 208.

The electronic communication network 212 may be a multiple access system that provides for communication, such as voice communication, data communication, video communication, messaging communication, or a combination thereof, between the vehicle 202, the external object 206, and an operations center 230. For example, the vehicle 202 or the external object 206 may receive information, such as information representing the transportation network 208, from the operations center 230 via the electronic communication network 212.

The operations center 230 includes a controller apparatus 232, which includes some or all of the features of the controller 114 shown in FIG. 1. The controller apparatus 232 can monitor and coordinate the movement of vehicles, including autonomous vehicles. The controller apparatus 232 may monitor the state or condition of vehicles, such as the vehicle 202, and external objects, such as the external object 206. The controller apparatus 232 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 232 can establish remote control over one or more vehicles, such as the vehicle 202, or external objects, such as the external object 206. In this way, the controller apparatus 232 may teleoperate the vehicles or external objects from a remote location. The controller apparatus 232 may exchange (send or receive) state data with vehicles, external objects, or a computing device, such as the vehicle 202, the external object 206, or a server computing device 234, via a wireless communication link, such as the wireless communication link 226, or a wired communication link, such as the wired communication link 228.

The server computing device 234 may include one or more server computing devices, which may exchange (send or receive) state signal data with one or more vehicles or computing devices, including the vehicle 202, the external object 206, or the operations center 230, via the electronic communication network 212.

In some embodiments, the vehicle 202 or the external object 206 communicates via the wired communication link 228, a wireless communication link 214/216/224, or a combination of any number or types of wired or wireless communication links. For example, as shown, the vehicle 202 or the external object 206 communicates via a terrestrial wireless communication link 214, via a non-terrestrial wireless communication link 216, or via a combination thereof. In some implementations, a terrestrial wireless communication link 214 includes an Ethernet link, a serial link, a Bluetooth link, an infrared (IR) link, an ultraviolet (UV) link, or any link capable of electronic communication.

A vehicle, such as the vehicle 202, or an external object, such as the external object 206, may communicate with another vehicle, external object, or the operations center 230. For example, a host, or subject, vehicle 202 may receive one or more automated inter-vehicle messages, such as a basic safety message (BSM), from the operations center 230 via a direct communication link 224 or via an electronic communication network 212. For example, the operations center 230 may broadcast the message to host vehicles within a defined broadcast range, such as three hundred meters, or to a defined geographical area. In some embodiments, the vehicle 202 receives a message via a third party, such as a signal repeater (not shown) or another remote vehicle (not shown). In some embodiments, the vehicle 202 or the external object 206 transmits one or more automated inter-vehicle messages periodically based on a defined interval, such as one hundred milliseconds.

The vehicle 202 may communicate with the electronic communication network 212 via an access point 218. The access point 218, which may include a computing device, is configured to communicate with the vehicle 202, with the electronic communication network 212, with the operations center 230, or with a combination thereof via wired or wireless communication links 214/220. For example, an access point 218 is a base station, a base transceiver station (BTS), a Node-B, an enhanced Node-B (eNode-B), a Home Node-B (HNode-B), a wireless router, a wired router, a hub, a relay, a switch, or any similar wired or wireless device located at, e.g., a cell tower. Although shown as a single unit, an access point can include any number of interconnected elements. The access point 218 may be a cellular access point.

The vehicle 202 may communicate with the electronic communication network 212 via a satellite 222 or other non-terrestrial communication device. The satellite 222, which may include a computing device, may be configured to communicate with the vehicle 202, with the electronic communication network 212, with the operations center 230, or with a combination thereof via one or more communication links 216/236. Although shown as a single unit, a satellite can include any number of interconnected elements.

The electronic communication network 212 may be any type of network configured to provide for voice, data, or any other type of electronic communication. For example, the electronic communication network 212 includes a local area network (LAN), a wide area network (WAN), a virtual private network (VPN), a mobile or cellular telephone network, the Internet, or any other electronic communication system. The electronic communication network 212 may use a communication protocol, such as the Transmission Control Protocol (TCP), the User Datagram Protocol (UDP), the Internet Protocol (IP), the Real-time Transport Protocol (RTP), the Hyper Text Transport Protocol (HTTP), or a combination thereof. Although shown as a single unit, an electronic communication network can include any number of interconnected elements.

In some embodiments, the vehicle 202 communicates with the operations center 230 via the electronic communication network 212, access point 218, or satellite 222. The operations center 230 may include one or more computing devices, which are able to exchange (send or receive) data from a vehicle, such as the vehicle 202; data from external objects, including the external object 206; or data from a computing device, such as the server computing device 234.

In some embodiments, the vehicle 202 identifies a portion or condition of the transportation network 208. For example, the vehicle 202 may include one or more on-vehicle sensors 204, such as the sensor 126 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 208.

The vehicle 202 may traverse one or more portions of the transportation network 208 using information communicated via the electronic communication network 212, such as information representing the transportation network 208, information identified by one or more on-vehicle sensors 204, or a combination thereof. The external object 206 may be capable of all or some of the communications and actions described above with respect to the vehicle 202.

For simplicity, FIG. 2 shows the vehicle 202 as the host vehicle, the external object 206, the transportation network 208, the electronic communication network 212, and the operations center 230. However, any number of vehicles, networks, or computing devices may be used. In some embodiments, the vehicle transportation and communication system 200 includes devices, units, or elements not shown in FIG. 2.

Although the vehicle 202 is shown communicating with the operations center 230 via the electronic communication network 212, the vehicle 202 (and the external object 206) may communicate with the operations center 230 via any number of direct or indirect communication links. For example, the vehicle 202 or the external object 206 may communicate with the operations center 230 via a direct communication link, such as a Bluetooth communication link. Although, for simplicity, FIG. 2 shows one of the transportation network 208 and one of the electronic communication network 212, any number of networks or communication devices may be used.

The external object 206 is illustrated as a second, remote vehicle in FIG. 2. An external object is not limited to another vehicle. An external object may be any infrastructure element, for example, a fence, a sign, a building, etc., that has the ability transmit data to the operations center 230. The data may be, for example, sensor data from the infrastructure element.

As mentioned briefly above, the large volume of transportation network data collected from vehicles, infrastructure, etc., can complicate its processing and usefulness, particularly at intersections within the vehicle transportation network. Systems and methods described herein reduce latency and/or complexity regarding the prediction of future behavior, address inconsistencies in the data, minimize notifications, or some combination thereof.

Figure 3:
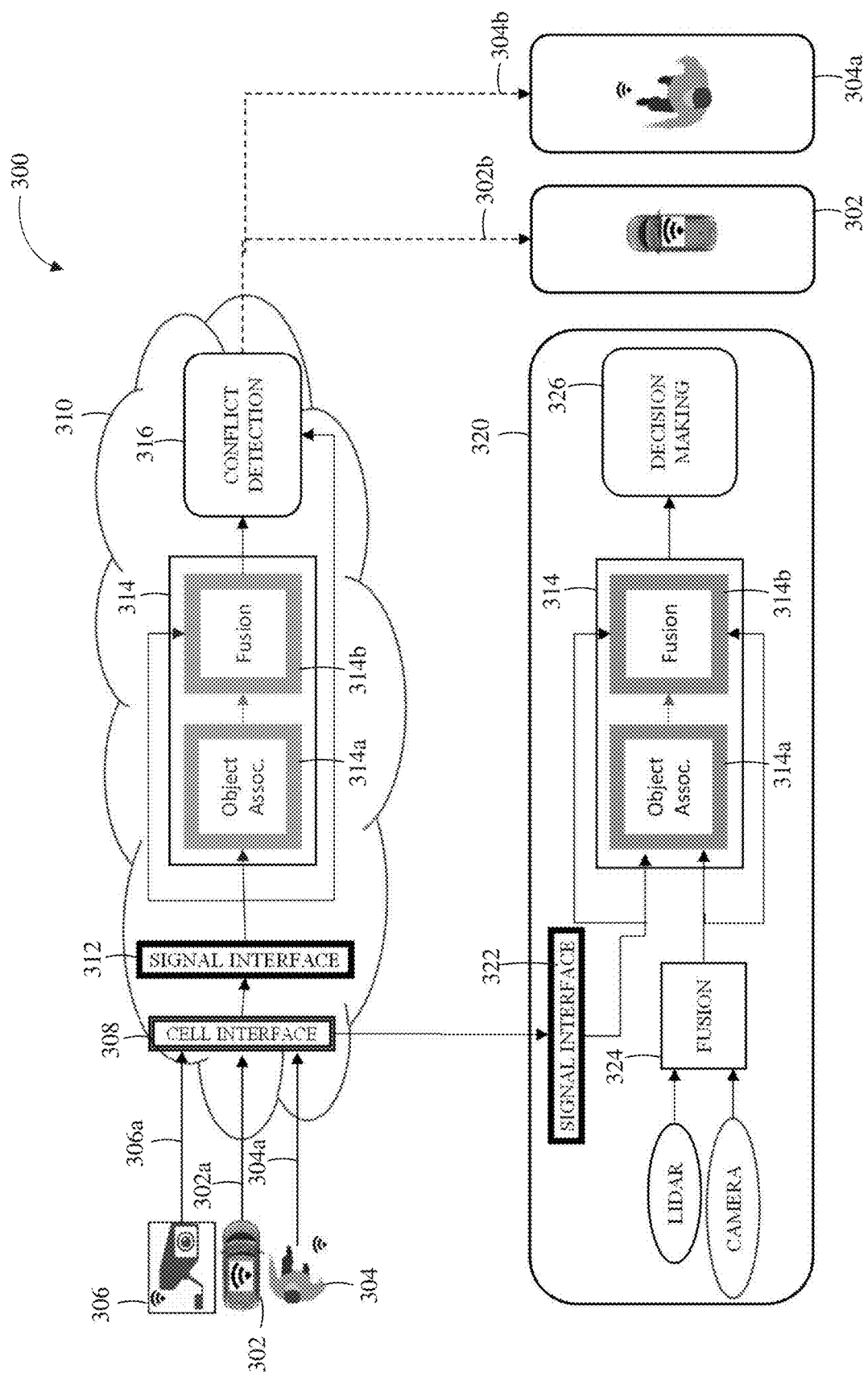
FIG. 3 is a diagram of a system for intersection collision avoidance according to implementations of this disclosure.

FIG. 3 is a diagram of a system 300 for intersection collision avoidance according to implementations of this disclosure. The system 300 may be implemented in a vehicle 302 transportation and communication system, such as the vehicle transportation and communication system 200, as discussed in more detail below. Although described with respect to a vehicle 302 traveling through a vehicle transportation network, such as the vehicle transportation network 208, the teachings herein may be used in any area navigable by a vehicle. An intersection within the vehicle transportation network, as used herein, encompasses vehicle-navigable paths that intersect each other, including entrances and exits to parking lots/garages and paths within (e.g., between parking spaces in) parking lots. Other examples of the system 300 can include more, fewer, or other components. In some examples, the components can be combined; in other examples, a component can be divided into more than one component.

In general, FIG. 3 illustrates a multi-layered architecture that uses multi-access edge computing (MEC) to process cooperative driving automation (CDA) messages sent from vehicles and infrastructure sensors. The MEC then sends back notifications to vehicles and other road users (e.g., vulnerable road users (VRU), such as pedestrians or bicycles) to avoid collisions. These other road users may be respectively referred to as a non-motorized road user herein. As shown, the system 300 desirably uses standards-based communications (e.g., a standards-based communication protocol) that eliminates the requirement for direct vehicle-to-vehicle (V2V) or vehicle-to-pedestrian (V2P) communications. In the example described, network cellular vehicle-to-vehicle (C-V2X) (also called Network C-V2X) is used for data/message exchange. The standard-based communications are based on the Society of Automotive Engineers (SAE) J3216 Standard for Cooperative Driving, but any suitable communication protocol may be used that is capable of wireless communication using cellular technology is possible.

The system 300 receives respective signals 302a from one or more connected vehicles 302, which may be a vehicle 100, 202. The signals 302a may include position, speed, or any other information. The signals 302a may comprise a BSM (e.g., SAE 2735 BSM). In some implementations discussed in further detail below, an intent signal INTENT may be transmitted from a connected vehicle 302.

The system 300 receives respective signals 304a from one or more VRUs, such as the pedestrian 304. The signals 304a may include position, speed, or any other information. The signals 304a may comprise a personal safety message (PSM) (e.g., SAE 2735 BSM). A VRU or non-motorized road user carries a communication device, such as a cellular device, to transmit a PSM and optionally receive notifications as described in more detail below. A cellular device, also referred to as a cellular-enabled device may be supported by a road user in any suitable manner.

The system 300 receives respective signals 306a from one or more infrastructure sensors, such as an infrastructure camera 306. An infrastructure sensor may be associated with infrastructure within the vehicle transportation network. An infrastructure sensor monitors at least a portion of an intersection. An infrastructure sensor may be incorporated into a standalone roadside unit (RSU), or may be mounted on a building, a traffic light, a streetlight, etc. The infrastructure camera 306 can send signals 306a including information about what is detected, e.g., vehicles, VRUs, autonomous vehicles (AV). The signals 306a may include position, speed, or any other information. The signals 306a may comprise a BSM when a vehicle is detected and a PSM when a VRU is detected.

The signals 302a, 304a, and 306a are received at a cellular interface 308, which may comprise a wireless cellular transceiver (or a combination of a wireless receiver and a wireless transmitter) or an access point, such as the access point 218, located at a cell tower. Processing the received data may be performed at the MEC 310. The MEC 310 includes a signal interface 312, a system to produce a shared world model (SWM) 314, and a conflict detection module 316. The MEC 310 sits at the edge of a mobile network (as opposed to cloud services on the public internet), such as at the network 212. For this reason, the MEC 310 provides low latency for this application. Further, because the computing happens on the cloud using, for example, a server computing device 234, the MEC 310 is highly scalable as compared to performing the computing solely within vehicles, e.g., using V2V communications.

In the implementation shown, SAE standards-based messages are sent from vehicles 302 to the MEC 310, from pedestrians 304, from infrastructure cameras 306, or other VRUs, or from combination thereof, using Network C-V2X over a cellular network. Further details of the communication system of the MEC 310, including the signal interface 312, may be seen by reference to FIG. 4, which is a diagram 400 of an example of communications between a vehicle, such as the vehicle 302, and the system 300 of FIG. 3.

Figure 4:
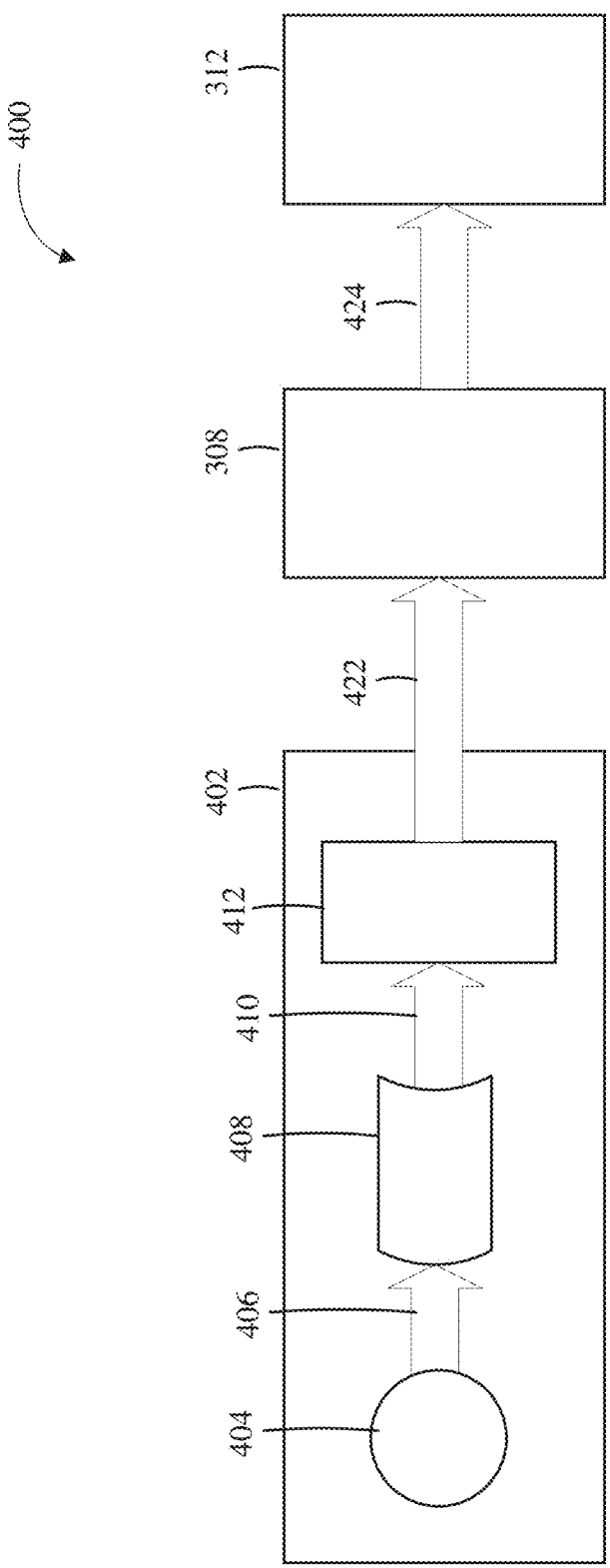
FIG. 4 is a diagram of an example of communications between a vehicle and the system of FIG. 3.

As shown in FIG. 4, the vehicle, such as the vehicle 100, 202 includes an interface 402. The interface 402 may be implemented at least in part by a processor, such as the processor 120. In this example, the vehicle 302 is a connected vehicle, but not an autonomous vehicle. A connected vehicle is one that is connected to the cellular network, either directly or by a cellular device of an operator. The interface 402 uses an intent 404 of the vehicle (e.g., of its operator) as input. The intent 404 of the vehicle 302 can be determined in any manner, such as the detection of a turn signal. The intent 404 can be input as a Robot Operating System (ROS) message in some implementations. A particularly useful optional technique for determining the intent 404 of the vehicle is described below.

The intent signal 404, also referred to as the signal INTENT herein, undergoes a data type conversion 406. The converted signal may be a JavaScript Object Notation (JSON) string 408. The JSON string 408 is converted to bytes 410 for input to an encoding mechanism 412. The encoding mechanism 412 encodes the bytes 410 and other sensor data (e.g., GPS) into an encoded signal in a format suitable for device-to-device communications over a cellular network. In an example, the encoding mechanism 412 encodes the data into JavaScript Object Notation (MQTT), which is a lightweight, publish-subscribe network protocol that transports messages between devices. The messages 422 are sent over a cellular network, such as the mobile network of a particular cellular provider, to a cellular interface, such as the cellular interface 308. The messages 422 may be sent over a 4G network, a Long Term Evolution (LTE) network, such as 4G LTE, a 5G network, or any other cellular network now known or hereinafter developed. The messages 422 may be sent using the electronic communication unit 118, in some implementations.

The cellular interface 308 receives the encoded messages 422 and distributes them to one or more signal interfaces 312 for a MEC 310. That is, the MEC 310 is scalable as described above. Accordingly, the signal interface 312 may be duplicated, along with the subsequent components of the MEC 310, to accommodate different portions of the transportation network, data above a defined amount, etc. The cellular interface 308 may thus act as a broker for the messages to determine which MEC 310 should process the incoming messages. The encoded messages 422 are transmitted through a network, such as a LAN 424, to the appropriate signal interface 312. The signal interface 312 converts the messages back to ROS or another format for use by the remaining components of the system 300, namely the SWM 314 and the conflict detection module 316.

As can be determined from this description, the interface 402 and the signal interface 312 comprise hardware that collectively act as a gateway between the messages used by the SWM 314 and the conflict detection module 316 and the cellular network. In this example, the interfaces respectively convert the data the MQTT format and publish the data and then, on receipt, the MQTT messages are converted back to another format (e.g., the native format of the SWM 314 and the conflict detection module 316) for use in the determination of a conflict/collision as described in further detail below.

While the interface 402 receives and encodes the signal INTENT, this is not required. Use of intent in the processing of FIG. 3 is optional. For example, the interface 402 could comprise only the encoding mechanism 412, which encodes vehicle sensor data such as latitude, longitude, pose, speed, etc., or any combination thereof (e.g., the BSM). FIG. 4 describes the interface 402 as being implemented in a vehicle, such as the connected vehicle 302. A similar interface may be incorporated in an infrastructure sensor, such as the infrastructure camera 306, for encoding and transmitting the detected signals, such as the signals 306a. Such an interface may either include or omit hardware/software to determine and include the intent of a vehicle where the vehicle is the detected object. A similar interface to the interface 402 that comprises an encoding mechanism may be included in a cellular-enabled device (e.g., a mobile phone) of a VRU to encode sensor data such as latitude, longitude, pose, speed, etc., or any combination thereof (e.g., the PSM).

Referring back to FIG. 3, the MEC 310 uses object fusion to generate a shared world model (SWM 314 that can be used for prediction and conflict detection. As can be seen from the above, the MEC 310 may receive data from more than one source regarding the same object. At an intersection, for example, the MEC 310 may receive signals 302a regarding the position, etc., of the connected vehicle 302 and receive signals 302a that include information regarding the position, etc., of the connected vehicle 302. Similarly, the MEC 310 may receive signals 304a regarding the position, etc., of the VRU (e.g., pedestrian 304) and receive signals 304a that include information regarding the position, etc., of the VRU. The SWM 314 receives the signals 302a, 304a, 306a, determines (e.g., converts to, detects, etc.) objects from the sensor data, and fuses objects detected by multiple sources (if any), and generates a single world view of the road users and their surroundings.

As shown in FIG. 3, the SWM 314 comprises object association 314a and object fusion 314b. In some implementations, the object association 314a may determine objects (e.g., road users) from the received signals 302a, 304a, 306a, e.g., the BSM and PSM messages. For example, object association 314a may associate location information within each of the messages with a respective road user, e.g., a connected vehicle, a VRU (e.g., a pedestrian or non-motorized vehicle), or an autonomous vehicle within the vehicle transportation network. The object association 314a may generate or maintain a state for at least some of the determined objects, such as a velocity, a pose, a geometry (such as width, height, and depth), a classification (e.g., bicycle, large truck, pedestrian, road sign, etc.), a location, or some combination thereof.

The object fusion 314b may receive the sensed objects over time, in addition to the signals, such as the signals 302a, 304a, 306a, e.g., the BSM and PSM messages. Using data such as the heading and velocity information, for example, sensed objects may be fused where appropriate. That is, the data associated with each object may be compared to determine whether respective objects identified by separate messages may be the same object. Any technique for comparing the data of each sensed object may be used. The more similar the data is, the more likely two objects are the same. The data of the objects determined to be the same object are fused to generate a tracked object at positions over time. Its fused trajectory (e.g., based on a combination of heading, pose, and speed, for example) may be used in the conflict detection module 316. That is, at the output of the SWM 314, each road user is a separate tracked object with a respective trajectory or intended path to supply to the conflict detection module 316 for use therein.

Although described as separate components of the SWM 314, a shared world model used in the MEC 310 may require many overlapping detections to produce a result. That is, the object association and fusion are coupled and performed iteratively. While this implementation of a shared world model may be used in the MEC 310, a particularly desirable implementation of the SWM 314 is described in detail below.

The conflict detection module 316 receives the tracked objects and their respective trajectories. The conflict detection module 316 uses this information to predict a possible collision between a connected vehicle, such as the connected vehicle 302, and nearby vehicles or VRUs, such as the pedestrian 304, at an intersection. The conflict detection module 316 does this, in some implementations, by using the trajectories over a look-ahead period to determine where each of the road users will be at time points in the look-ahead period.

In some examples herein, an infrastructure sensor of a RSU may detect non-connected road users (e.g., pedestrians) and connect to connected road users (e.g., connected vehicles). For non-connected road uses, prediction can be done by measurements from infrastructure sensor(s) over time (e.g., speed and heading). For connected road users, the intended path can be similarly predicted from such measurements. At intersections, however, the measurements may not provide the best indication of the intended path because there may be a change, such as a turn, that is not identifiable from the measurements. Accordingly, in some implementations the signal INTENT may be used for determining the intended path for connected vehicles as described in additional detail below. The predicted/intended trajectories of the road users can then be compared to determine if conflict would occur.

For conflict detection between a non-connected road user (e.g., a pedestrian or non-connected vehicle) and a connected vehicle, the locations at time points or steps in the look-ahead period that the non-connected user is likely to reach are determined, as are those for the connected vehicle, e.g., using the precited/intended paths and speeds. The distance between paths at future time steps may be computed. Then, when the distance between the paths is shorter than a threshold, a conflict may be detected. Stated differently, if two or more road users are within a defined proximity of each other at a particular time point, the conflict detection module 316 can identify a potential conflict and optionally send a notification to the connected vehicle and any other affected road user.

This is one technique for detecting a potential conflict at some point in the future between the two paths. However, other techniques are possible, another of which is described below by example. Notifications are also described in more detail below.

In some implementations, conflict detection may use the intent of the operator of the connected vehicle to determine the path of the connected vehicle for at least a portion of the look-ahead period. This is the signal INTENT received with the signals 302a from the connected vehicle 302 in some implementations. The signal INTENT may be used to share the operator's intentions for cooperative driving. Traditional safety systems may not consider intentions that are not otherwise indicated by the pose, heading, velocity, etc., and may thus overly rely on the proximity of the connected vehicle and other vehicles or VRUs near an intersection.

In the example described above, the turn signal may be used to determine the operator's intent for use in the conflict detection module 316. For example, the turn signal may indicate that the connected vehicle 302 will be taking a right turn at a 4-way intersection. Together with the other information received from the road users near the intersection, notifications may issue from the conflict detection module 316 that are the result of more accurate predictions than relying solely upon the BSM and PSM messages. A specific example of the signal INTENT is discussed further below.

Where a connected autonomous vehicle (CAV) is at or near an intersection that a connected vehicle or VRU is approaching or navigating, decision making of the CAV may be improved by using the teachings herein. In FIG. 3, a CAV 320 is conventionally shown as including sensor inputs into a fusion unit 324. The hardware sensors shown include a camera and a Light Detections and Ranging sensor (LiDAR). Other sensors conventionally found on an autonomous vehicle may include a GPS and a radio detection and ranging (RADAR) sensor. The fusion unit 324 receives the signals and fuses the objects identified by the sensors into tracked objects for inclusion in a shared world model executed by a processor of the CAV 320, such as the processor 120 of FIG. 1.

An autonomous vehicle, such as the CAV 320, conventionally has a shared world model. According to implementations of this disclosure, the shared world model of the CAV 320 can also receive the BSM and PSM messages from the cellular interface 308 to refine the shared world model. That is, in addition to reconciling its own sensor values to identify objects using the fusion unit 324, the CAV 320 may include another instance of the SWM 314 executed by a processor of the CAV 320, such as the processor 120 of FIG. 1, to generate tracked objects and their respective trajectories. The shared world model of the CAV 320 may also be different from (i.e., operate differently from) the SWM 314 in some implementations. In either event, the tracked objects and their respective trajectories are sent to a decision-making module 326. The CAV 320 does not need a separate conflict detection module, like the conflict detection module 316, because the decision-making module 326 may be a conventional module for decision making that already addresses conflict detection and resolution.

As mentioned above, a shared world model may be used in a system for intersection collision avoidance, whether that system is located within a vehicle or at a remote computing location. In general, object detections from multiple sensors are desirably combined to avoid confusing the system. For example, the multiple sensors may detect pedestrians at different locations, when only one pedestrian is present. Failure to use a shared world model may cause the ego vehicle to attempt a maneuver around the multiple pedestrian detections instead of the single pedestrian.

In some implementations of a shared world model that can be used as the SWM 314, the time to combine object detections from multiple sources may be dictated by the slowest sensor. This is because the shared world model can require overlapping detections that iteratively perform object association and fusion. A result can take up to a second to be produced. This situation is made worse when communication delays are added. For example, in the system 300, communication delays may occur when sending information over the cellular network from a connected sensor. Receiving and resolving sensor data in a timely fashion are important for making safety-critical maneuvers, e.g., activating automatic emergency braking (AEB) or swerving.

Figure 5:
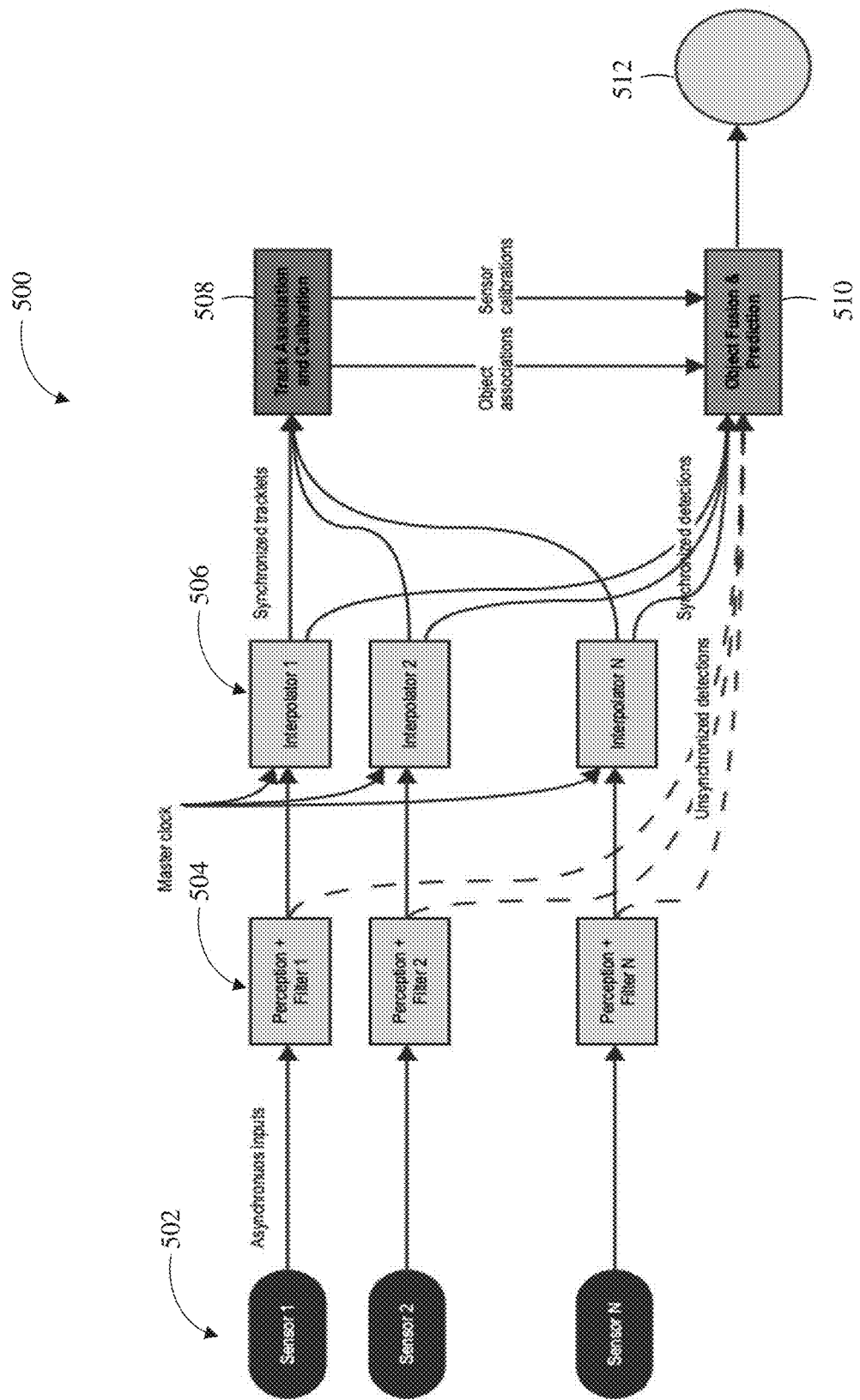
FIG. 5 is a diagram of a system that generates a shared world model for intersection collision avoidance according to implementations of this disclosure.

One particularly desirable system 500 that generates a shared world model is shown by example in FIG. 5. The system 500 addresses some of the latency issues mentioned above by decoupling the object association and object fusion steps to combine the object detections from different sensors. The resulting shared world model may be used as the SWM 314 in FIG. 3. The resulting shared world model may be used for intersection collision avoidance according to implementations of this disclosure. The proposed architecture of the system 500 allows quicker action than conventional techniques and is limited only by the fastest sensor, not the slowest (e.g., the most delayed) sensor. While particularly useful with the MEC 310 and optionally connected autonomous vehicles, such as CAV 320, the system 500 may be used with any autonomous vehicle that receives external sensor data (i.e., sensor data from sensors other than those of the autonomous vehicle).

As can be seen in FIG. 5, inputs 502 are received from sensors numbered 1, 2, . . . N. The inputs 502 may correspond to the BSM from a connected vehicle, the PSM from a VRU, the PSM from an occupant in a connected vehicle, the PSM from an infrastructure sensor, the BSM from an infrastructure sensor, or some combination thereof as described above with regards to FIG. 3. At least some of these inputs 502 are asynchronous signals or messages. That is, the sensors each have their own characteristics, such as sampling rates. Moreover, the amount of time required for each sensor to communicate with the SWM 314 (e.g., to the cellular interface 308 in FIG. 3) may vary. Thus, their respective signals may be sent at different times and/or received at different times.

The inputs 502 are received at respective perception and filter modules 504. The perception and filter modules 504 may implement, in part, the object association 314*a*. The perception and filter modules 504 produce, determine, perceive, or otherwise identify objects (e.g., road users) from respective inputs. Any technique may be used to identify the objects from the inputs, including but not limited to pattern matching, comparisons to libraries of data, etc. As shown by the dashed lines in FIG. 5, detections of the perceived objects from the different sensors are immediately sent to downstream decision-making (e.g., the object fusion and prediction module 610 described below) while the object association continues in parallel at the interpolators 606. The detections may be referred to as unsynchronized detectors.

A master clock that can reference a variety of timing sources provides a synchronized output to the interpolators 506. The perceived objects are also provided to the interpolators 506 as described above. The perceived objects are provided with time points at which they are perceived, which time points are unsynchronized. Each of the interpolators 506 for a respective perceived object may be used to interpolate the perceived objects at a synchronized timing based on the signal from the master clock. That is, based on the unsynchronized detections and other data from the inputs 502 (e.g., velocity, headings, etc.), the location of the perceived objects at the synchronized time points indicated by the mater block are determined.

Each of the interpolators 506 outputs two signals based on the location of the perceived objects at the synchronized time points. The first signal is referred to as a synchronized tracklet. A synchronized tracklet is a location of a perceived object at each time point indicated by the master clock. These tracklets are provided to a track association and calibration module 608 and an object fusion and prediction module 510. The second signal is referred to as a synchronized detection. These synchronized detections are provided to the track association and calibration module 508 and the object fusion and prediction module 510.

The track association and calibration module 508 receives the synchronized tracklets and the synchronized detections and associates the signals at the synchronized time points with respective objects over time. Object association is the matching of objects perceived by one sensor with objects perceived by another, perhaps from a different vantage point (e.g., infrastructure camera observations of a pedestrian with the reported GPS position of the pedestrian from their phone). The track association and calibration module 508 may also compute extrinsic relative sensor calibrations. The object associations and sensor calibrations are sent to the object fusion and prediction module 510.

The object fusion and prediction module 510 fuses duplicate detections in a shared world model. This includes objects and their predicted paths, for example. The shared world mode is sent for decision making 512. For example, connected road users (vehicles, pedestrians, etc.) may rely on cloud conflict detection decision making, such as at the conflict detection module 316, to send timely warnings of detected hazards. An autonomous vehicle relies firstly on its own sensors for decision making but can augment its world model with (delayed) detections from the off-board connected sensors when available., such as at the decision-making module 326.

The sensor calibrations aid in the fusion of objects. They may also be retained to speed up future associations.

In addition to reducing latency over competing techniques for generating a shared world model, the system 500 may produce a more accurate shared world model. That is, performing object fusion with incorrectly associated objects results in errors that are difficult to correct. By the delay in object fusion resulting from the decoupling of object fusion from object association, the chances of such errors are reduced.

As mentioned with regards to the description of FIG. 3, the intent of a vehicle (e.g., the intent of an operator of the vehicle) may be useful in collision or conflict detection. The probability of a collision of a vehicle (e.g., a connected vehicle) with another vehicle or a VRU can be predicted with higher accuracy if the intended path of each vehicle is known for the next few seconds. For example, if a right turn signal is on, whether the vehicle is going to take a right turn, pass a vehicle, or make a lane change may not be clear from the heading or speed alone.

Figure 6:
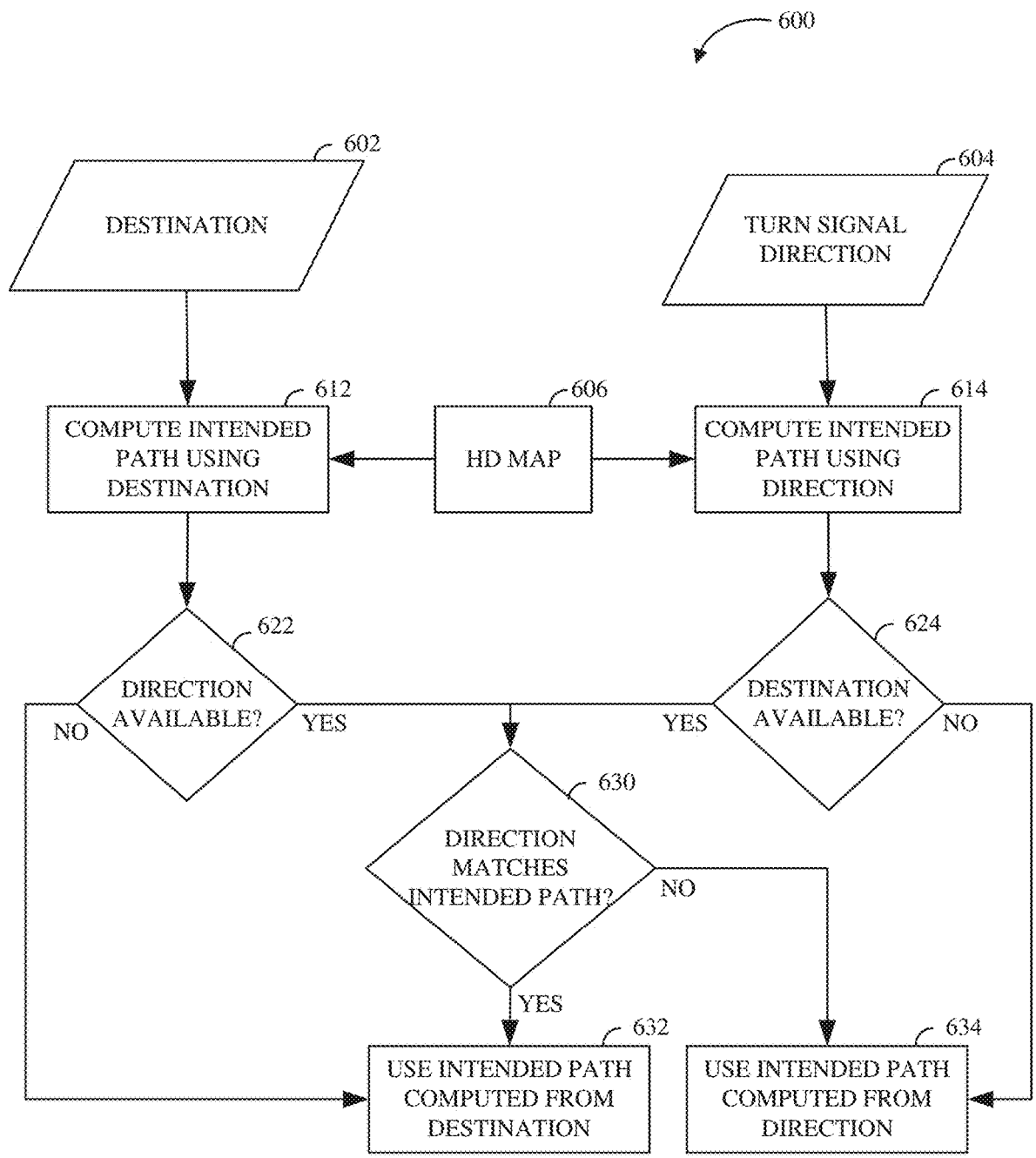
FIG. 6 is a flowchart of a method for determining the intent of a vehicle.

In general, a technique proposed herein can use a high-definition map (HD map) in conjunction with either the destination entered in the navigation system or the turn signal to predict the future path of a connected vehicle. FIG. 6 is a flowchart of a method 600 for determining the intent of the connected vehicle. The method 600 may be performed by a processor of a connected vehicle, such as a processor of the connected vehicle 302. The processor of the connected vehicle may be a standalone processor, the processor of an on-board navigation system, or a processor incorporated into a cellular interface of the connected vehicle such as the interface 402.

At 602, a destination message for a connected vehicle of interest (e.g., a vehicle entering, traversing, approaching, etc., an intersection) may be determined or received. The destination message, when present (e.g., the vehicle has one established), may be determined or received from an on-board navigation system of the vehicle. At 604, a turn signal direction message for a vehicle may be determined or received. The turn signal direction may also be referred to as the direction of the turn signal or simply the direction herein. The turn signal direction may be determined periodically, when the vehicle is within a defined distance from an intersection, and/or when the vehicle generates a turn signal change message responsive to an operator action to engage or disengage the turn signal. When the turn signal is off, the direction is straight ahead.

The HD map is used for input at 606. Namely, the HD map may provide input at 606 to compute a possible intended path for the vehicle using the destination (e.g., destination message) at 612. For example, the possible intended path may be or include a lane-wise path to the destination. Because a HD map provides speed limits and other road features like stop lines and pedestrian crossings, this information may be used to define multiple waypoints along the path with information like the type of waypoint and a speed limit (also referred to as drive goals) for the next few seconds, such as 10-15 seconds.

Alternatively, or additionally, the HD map may provide input at 606 to compute a possible intended path for the vehicle using the turn signal direction at 614. The speed limits and other road features like stop lines and pedestrian crossings of the HD map may provide input at 606 to define the multiple waypoints along the path with information like the type of waypoint and a speed limit for the next few seconds considering, for example, whether the turn signal direction indicates a right turn, a left turn, or is off (e.g., when entering an intersection or after a turn or lane change is completed).

Once the possible intended path is computed at 612, 614, or both, the method 600 advances to determine which possible intended path is most accurate prediction. Where there is a destination available at 602, and the possible intended path is computed at 612, the method 600 queries at 622 whether the turn signal direction is available. If not, the method 600 uses the possible intended path computed from the destination as indicating the intent of the vehicle at 632. In contrast, where there is a turn signal direction available at 604, and the intended path is computed at 614, the method 600 queries at 624 whether there is a destination available. If not, the method 600 uses the possible intended path computed from the turn signal direction as indicating the intent of the vehicle at 634.

If both there is a turn signal direction at 622 and a destination at 624, the method 600 determines, at 630, whether the turn signal direction matches the possible intended path computed at 612. For example, the method 600 determines whether the intended path includes a right turn or a change to a right lane where the turn signal changes to a right turn. If they match at 630, the method 600 uses the intended path computed from the destination as indicating the intent of the vehicle at 632. If not, the method 600 uses the intended path computed from the turn signal as indicating the intent of the vehicle at 634. These choices reflect two considerations. First, the turn signal alone is not the most accurate measure of the driver intent. Second, if both the turn signal and the destination are available, the turn signal may improve the measure of the driver intent. For example, a turn signal that contradicts the intended path determined at 612 likely indicates that the operator of the vehicle has decided to alter the mostly likely path generated using the destination.

In either case, the drive goals help in determining when and where the vehicle is predicted to be at a particular time within the next few seconds. This information may be used, along with the presence, intent, or both, of other road users (e.g., vehicles, VRUs, etc.) to predict the probability of a conflict or collision. For example, the points along each of the predicted paths for the road users at an intersection may be used to identify possible collisions in the event no action is taken as described above with regards to the conflict detection module 316.

In some implementations, the intended path determined by repeatedly performing the method 600 may be used to produce the signal INTENT, which indicates the intent of the connected vehicle (e.g., of an operator of the connected vehicle), as described with regards to FIG. 3. Where used in the implementation of FIG. 3, the signal INTENT may be used as input to the conflict detection module 316.

In an example, when a destination is set in a navigation system, the path to the destination is generated using the HD map at 612. This gives a list of lane segments starting from the current position of the car until the destination. For generating intent, only a portion of the path ahead that the vehicle will travel in a defined amount of time or a defined distance may be considered. For example, only the portion of the path in the next 15 seconds or 500 meters, whichever is larger, is considered. This limits the amount of data that will need to be sent for the intent. A list of drive goals (e.g., waypoints, time points, time steps) is generated starting from the lane segment where the car is until an end of the selected path (e.g., until an end of the portion of the path). Each drive goal may contain information such as speed limit, goal type (e.g., stop, pedestrian crossing etc.). An example of the format of an intent message (e.g., the signal INTENT) is as shown below.

| | |
|---|---|
| temp_id | Vehicle ID |
| Latitude | Current position of the vehicle |
| Longitude | Current position of the vehicle |
| Heading | Current heading of the vehicle |
| Speed | Current speed of the vehicle |
| drive_goals | List of drive goals |

The list of drive goals in the intent message may be separate drive goal messages. An example of the format of a drive goal contained within the intent message is as shown below.

| | |
|---|---|
| drive_goal_id | ID of this drive goal |
| lane_id | Unique identifier (ID) of the lane segment in the HD map |
| Latitude | Expected position of the vehicle for this goal |
| Longitude | Expected position of the vehicle for this goal |
| Heading | Expected heading of the vehicle for this goal |
| approach_speed | Desired speed of the vehicle in the segment between the end of the previous drive goal and arriving at this goal |
| longitudinal_position | Distance from beginning of lane |
| distance_from_previous_goal | Distance from previous drive goal |
| Type | Drive goal label according to purpose |

If turn signal is going to be used, then the path ahead (lane segments) is queried from the HD map. If another intersection comes after the immediate turn, then the intended path may be generated only until the new intersection. Then, a new intended path may be generated for the next intersection.

Using a HD map along with either the destination or turn signal (or both) according to the teachings herein allows predicting with a higher accuracy what a connected vehicle may be doing than using speed and heading. For example, the technique provides not only the intent but also the intended speed at different points along the path. Moreover, the technique allows the determination of which lanes that the vehicle will follow for the next few seconds. This is useful in safety applications for notifying drivers of an impending collision.

For non-connected vehicles and VRUs, heading and trajectory can be used to determine the predicted path for the look ahead period (in this example, 15 seconds or 500 meters) as described briefly above with regards to FIG. 3. In some implementations, at least a portion of the method 600 may be performed by a processor in a RSU that supports an infrastructure sensor (e.g., the infrastructure sensor is housed by the RSU), such as an infrastructure camera 306. For example, the RSU may determine, at 604, a turn signal change message for a non-connected vehicle. The turn signal change message, when present, may be detected from images received by the infrastructure sensor. From that, the intended path may be computed at 614 and used as a signal INTENT at 734 for conflict detection, such as at the conflict detection module 316 or by the processor of the RSU.

As may be understood from the above description, uncertainties can exist in the intended or predicted paths, e.g., due to the technical limitations of infrastructure sensors, the imperfection of prediction models, and the unknown intentions of road users, particularly VRUs. To address some of these uncertainties and improve the detection of potential conflicts, such as at the conflict detection module 316, a technique described herein describes conflict or hazard zones where VRUs can conflict with vehicles. This technique may be described with reference to FIG. 7, which is a diagram of an intersection 700.

Figure 7:
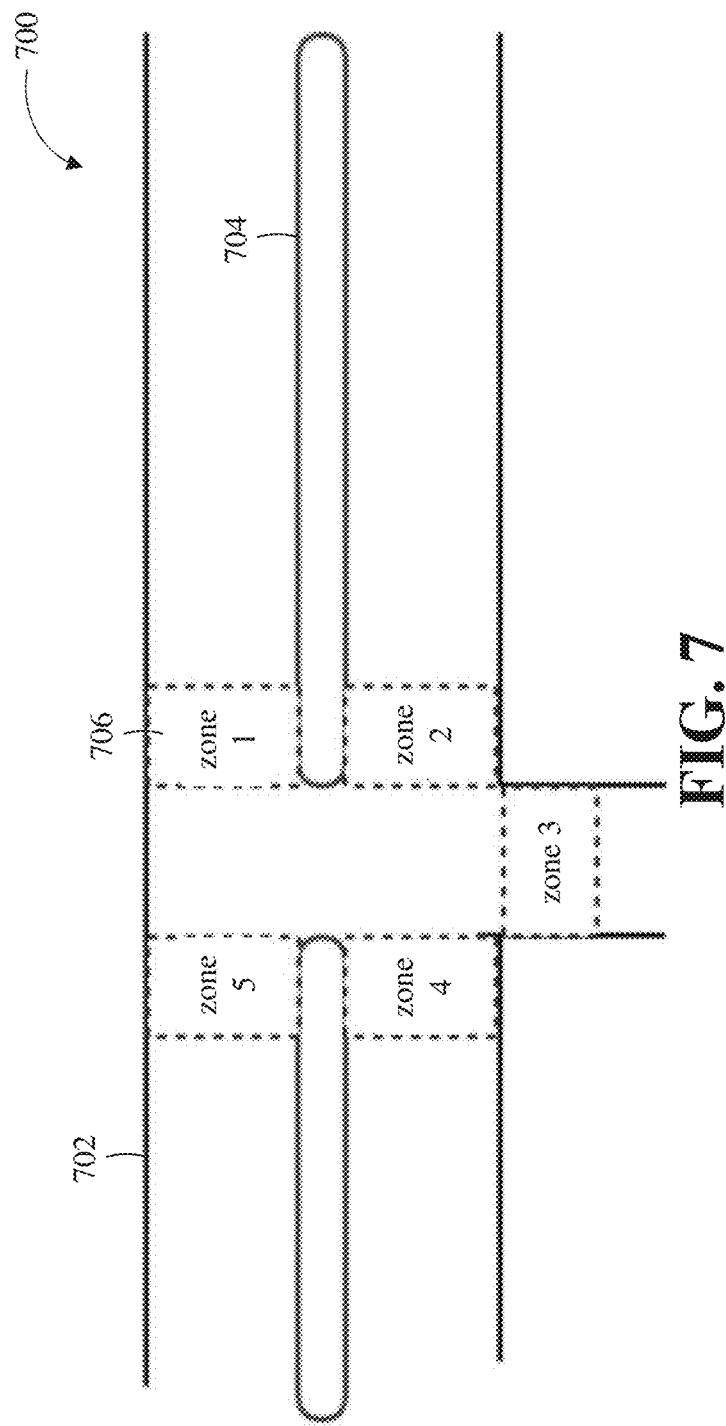
FIG. 7 is a diagram of hazard zones at an intersection.

FIG. 7 is a three-way intersection 700, where the street 702 has a road divider 704. In some implementations, zones may be predefined for an intersection based on where a VRU may cross a road, such as where the likelihood of a conflict is high. The size of the zones may be determined based on statistics of VRU (e.g., pedestrian) incidents, such as how far a VRU is likely to travel within the intersection at different locations and at different speeds. FIG. 7 shows five zones 706 by example. A default zone size may be defined. In some implementations, a zone size may be determined at the time of detection of a VRU, based on the location of the VRU relative to the intersection, and optionally the type of VRU and/or the speed of the VRU (e.g., a bicycle would have a larger zone than a pedestrian).

In operation, a processor associated with a RSU (e.g., one associated with an infrastructure sensor of the RSU) or one associated with a shared world model, such as the SWM 314, can identify a location of a VRU (as a non-connected road user) over time. Once identified, a zone can be defined for the VRU. The zone may be a predefined zone at a detected location, a default zone size placed according to the location, or a zone size determined as described above placed according to the location. As described above by reference to the example of the conflict detection module 316, the measurements so made may be used to generate a predicted path.

Instead of limiting road users to a predicted path for the detection of a potential collision within an intersection, the zone can be used in conflict detection where at least one of the road users is a VRU. In an example where a vehicle is approaching an intersection with a VRU also present, the time that the VRU is crossing the zone, such as one of the zones 706, may be determined using the predicted trajectory. The time that the vehicle is going to cross the zone may determined according to the predicted path (e.g., in the absence of the signal INTENT) or intended path (e.g., where signal INTENT is used). As described previously, this may be performed at time steps or points for a look-ahead period. Once the points are known, a potential conflict is identified if the intended path of the vehicle and the predicted path of the VRU would cross the zone at the same time.

Figure 8:
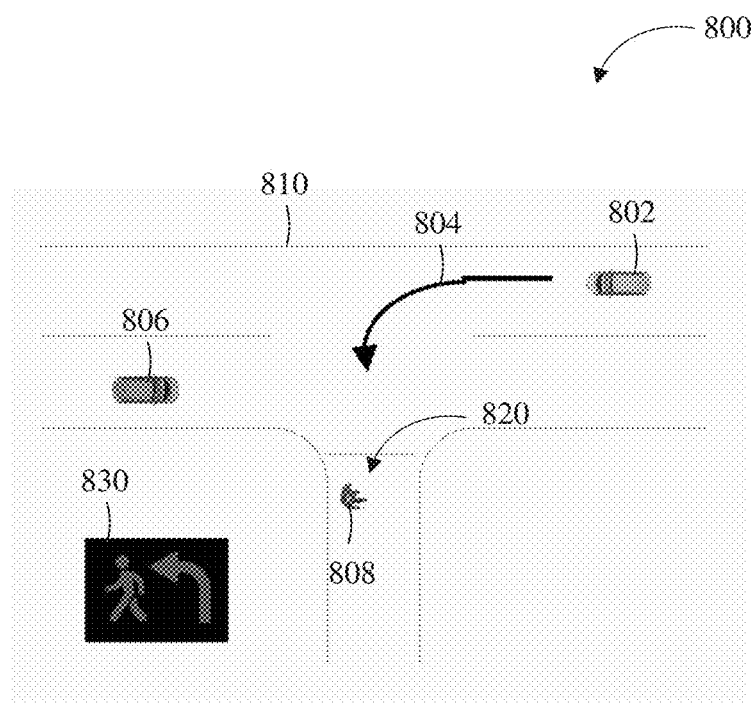
FIG. 8 is a diagram of a three-way intersection where a hazard zone according to FIG. 7 is used to determine a potential conflict.

For example, FIG. 8 shows a three-way intersection 800 similar to the intersection 700 shown in FIG. 7 except that no road divider 704 exists. Thus, three zones may be defined for the intersection. In FIG. 8, an ego (e.g., a connected) vehicle 802 is traveling in a first direction along a street 810. An arrow 804 shows the intended path of the vehicle 802. A (e.g., non-connected) vehicle 806 is traveling in the opposite direction along the street 810. A pedestrian 808 (e.g., a VRU) has a predicted path crossing the zone 820. Based on when the vehicle 802 will cross the zone 820 as compared to the pedestrian 808, a potential conflict is detected. Thereafter, a notification 830 to the ego vehicle 802 may issue, such as from the conflict detection module 316. If a conflict is detected, the level of conflict may be computed based on level of deceleration is needed to avoid collision. In some implementations, the level of deceleration may be compared to a maximum deceleration such that a notification does not issue until the level of deceleration approaches the maximum deceleration.

Figure 9:
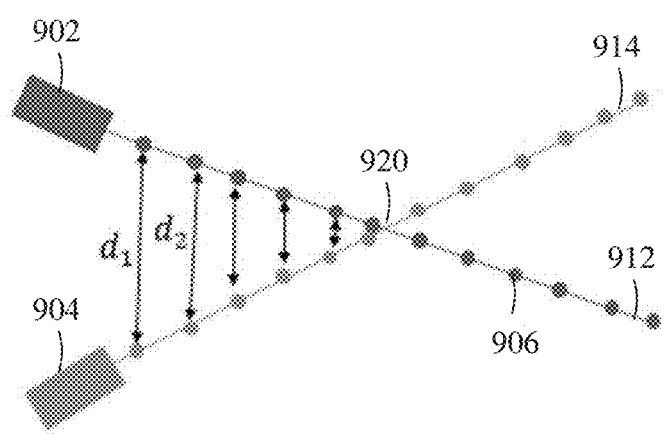
FIG. 9 is a diagram illustrating intended paths of two vehicles and distances between the two vehicles at future time points used to determine a potential conflict at an intersection.

As described above with regards to the conflict detection module 316, for conflict detection between vehicles, whether connected or non-connected, a predicted path of each of the vehicles may be determined. That is, the paths and speeds of each vehicle may be used to compare the future positions of the vehicles. Referring to FIG. 9, for example, a first vehicle 902 may have a predicted path 912 at defined time steps 906, while a second vehicle 904 may have a predicted path 914 at the same defined time steps 906. That is, the paths and speeds of the vehicles are used to compute their respective future positions. The distance between the paths 912, 914 at future time steps 906 may be computed. In FIG. 9, distance $d_1$ is a first distance between the paths 912, 914, while distance $d_2$ is a second distance between the paths 912, 914. The paths 912, 914 are converging to a potential conflict at 920. When the distance between the paths 912, 914 is shorter than a threshold at some point before 920, the potential conflict is identified, and a notification may be issued. When at least one of the vehicles is a connected vehicle, the associated path 912 or 914 may be a intended path (i.e., one that considers vehicle intention, such as the signal INTENT).

While a zone may be used for conflict/collision detection in the case of a VRU as described above, a zone may also be used in a similar manner for other non-connected road users, such as a non-connected vehicle.

Whatever the type of road users approaching the intersection, conflict detection may be performed by a processor of a RSU instead of, or in addition to, the conflict detection module 316. To do so, RSU may host a shared world model matching the SWM 314 and conflict detection module 316 of the MEC 310 that receive the signals from the cellular interface 308 in a similar manner to the way the signal interface 322 receives the signals. Alternatively, the RSU may host a conflict detection module, similar to the conflict detection module 316, that receives the objects and trajectories from the SWM 314 (e.g., over the wireless cellular network) to perform conflict detection and issue notifications where appropriate. In another implementation, the intended path of a connected vehicle can be received at a RSU.

Conflict warnings at the intersection can reduce risks of conflicts to VRUs and other road users. A useful early warning for conflict needs not only to be accurate and precise, but also needs to be targeted. The warning should be given to the operator of a vehicle when it is really needed. Providing warnings to all the detected conflicts may not really help operators prevent conflicts. Too many warnings may overwhelm operators or distract operators from critical conflicts. On the other hand, a complex traffic situation may distract the attention of a vehicle operator from situations that may be safety critical to VRUs.

A technique is next described that can be used to identify or otherwise model which driving situations (e.g., paths through an intersection) are more critical for safety warnings or notifications than other paths. Knowing this, targeted warnings or notifications may be delivered to a (e.g., connected) vehicle, while avoiding or minimizing warnings that would be less useful. The technique may use a database that includes the paths for an intersection that are identified as more critical than others. The database may be stored in a storage device or memory located at the MEC 310 or a storage device or memory of a RSU for a given intersection.

Figure 10:
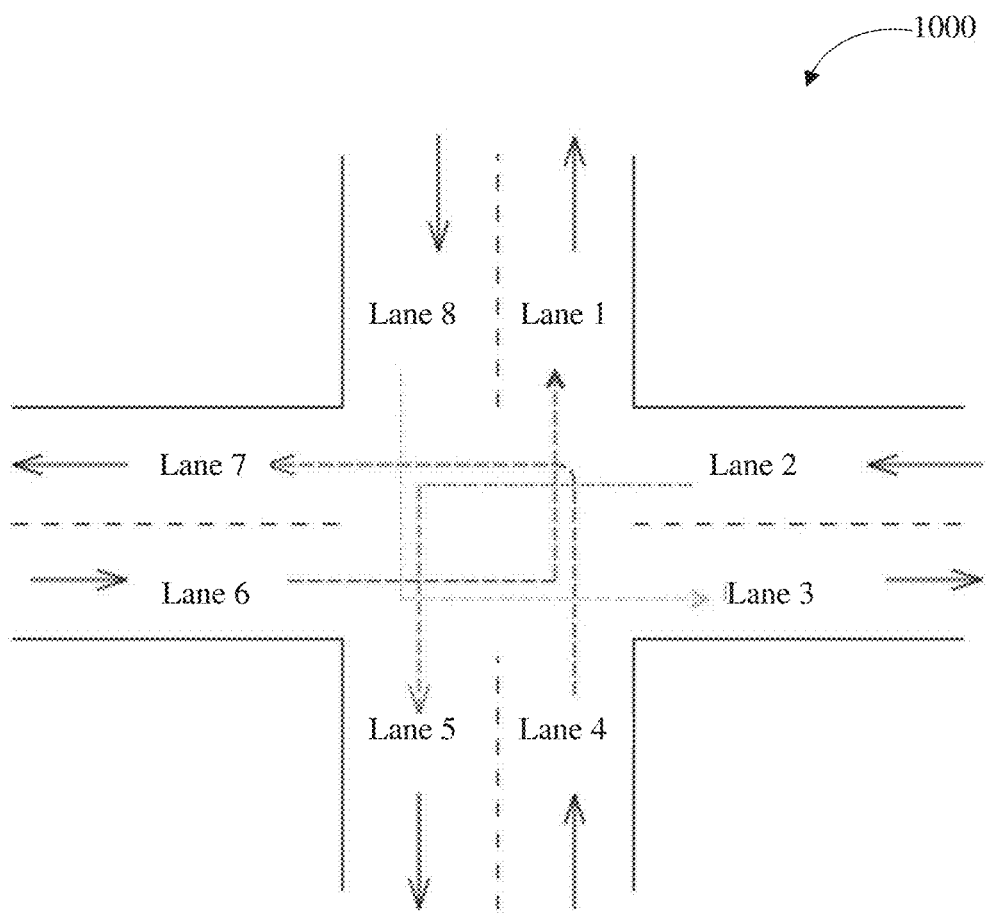
FIG. 10 is a diagram of a four-way intersection used to explain how to generate targeted warnings in response to conflict detection.

An example of identifying the paths that are more critical and the content of the database may be illustrated with reference to the four-way intersection 1000 of FIG. 10. In general, the paths identified are those where an operator would tend to be distracted from VRUs in favor of other road users. In such cases, extra attention by the operator may be desirable. In a regular intersection where a vehicle travels in a right lane, such as the intersection 1000, an operator may miss VRUs (e.g., non-motorists) while navigating (e.g., unprotected) left turns because the operator is paying more attention to opposite traffic. FIG. 10 indicates the direction of travel for a vehicle in lanes of the intersection by the solid lines. As shown by the dashed line in FIG. 10, there are four left turns through which a vehicle may traverse the intersection 1000. Thus, there are four possible paths through the intersection 1000 where the vehicle can take a left turn as shown in Table I below.

TABLE I

| Path | Enter | Exit |
|---|---|---|
| First left turn | Lane 4 | Lane 7 |
| Second left turn | Lane 2 | Lane 5 |
| Third left turn | Lane 8 | Lane 3 |
| Fourth left turn | Lane 6 | Lane 1 |

In this implementation, these paths are more critical than the four straight paths through the intersection 1000 from Lane 4 to Lane 1, from Lane 2 to Lane 7, from Lane 8 to Lane 5, and from Lane 6 to Lane 3, and are more critical than the four right-turn paths through the intersection 1000 from Lane 4 to Lane 3, from Lane 2 to Lane 1, from Lane 8 to Lane 7, and from Lane 6 to Lane 5. In other implementations, the right-turn paths may also be considered more critical than the four straight paths.

In operation, an intended path for a connected vehicle, such as the connected vehicle 302, may be received. As described above, the intended path may be generated using the signal INTENT. In some implementations, a predicted path may be received instead of an intended path. As described above, the predicted path may be generated using sequential signals including location, heading, etc., from the connected vehicle 302, from an infrastructure sensor, such as the infrastructure camera 306, or both (e.g., optionally combined into a shared world model, such as the SWM 314). The intended path determines (defines, identifies) both the entering lane and the exiting lane for the vehicle. The combination of entering and exiting lanes for the intersection may then be compared with the intended path to determine whether the path is within the database as being a path that requires additional driver or operator attention.

If the combination is within the database, the path may be labeled or otherwise identified within the conflict detection process, such as the process performed by the conflict detection module 316, for additional consideration. In FIG. 10, for example, if a vehicle is taking the path from Lane 2 to Lane 5, then the path would be labeled because this path is located within the database as shown in Table I. In contrast, if the vehicle is taking the path from Lane 2 to Lane 7, the path would not be labeled.

Once the path is identified to the conflict detection process, additional consideration may be given to the path. That is, the path uses a notification process different from a standard notification process. For example, a notification threshold may be modified so that the conflict detection module 316 provides the operator of the connected vehicle an earlier notice of the presence of a VRU than the conflict detection module 316 would for other paths. This may be achieved by, in some implementations, decreasing the maximum deceleration value described previously. In other implementations, the additional consideration given to the path may correspond to providing a notification based on a VRU being within a defined distance from the connected vehicle without regard to whether a potential conflict exists or does not exist resulting from the conflict detection.

FIG. 10 and Table I present one intersection by example. Referring back to FIG. 8, an example of a three-way intersection 800 is shown. In this example, there is one unprotected left turn because the street the pedestrian 808 is crossing has a stop sign (as can be seen by the stop line). Hence, the database includes one entry. The vehicle 802 is taking a left turn as indicated by the arrow 804, which left turn corresponds to the path identified in the database for the intersection 800. The conflict detection process issues the targeted warning or notification 830 based on criteria for paths within the database that is different from the criteria used for either the straight-ahead path for the vehicle 802 or for a vehicle approaching the stop line in the other direction.

Detecting potential collisions or conflicts and sending a warning for all paths through the intersection is not necessary. All such warnings or notifications may overwhelm or distract an operator. According to the teachings herein, a driver attention model (e.g., using the database) includes paths that an operator may be distracted from VRUs in favor of other road users. The path of a connected vehicle so included is identified so that an operator can pay additional attention to a VRU. The attention model is easy to build and easy to maintain, so the model easily adapts to different intersections. Further, the model may be easily adjusted based on statistics of accidents at an intersection, making the system both flexible and robust.

The above explanations describe road users that are relatively easy to detect. Some road users, particularly VRUs, may be hard to detect. This makes accurately targeting notifications difficult.

For example, occlusion is important for the safety of VRUs at an intersection. VRUs that cannot be easily seen by operators or detected by on-board sensors may cause higher risk of collision at an intersection. A technique for detecting whether a VRU is occluded to a vehicle and sending an early warning to the vehicle to the reduce risk of collision between the vehicle and the occluded VRU at the intersection is next described with reference to FIG. 11, which shows an intersection integrated with the system 300. However, the technique may be used solely with a RSU for a given intersection.

Figure 11:
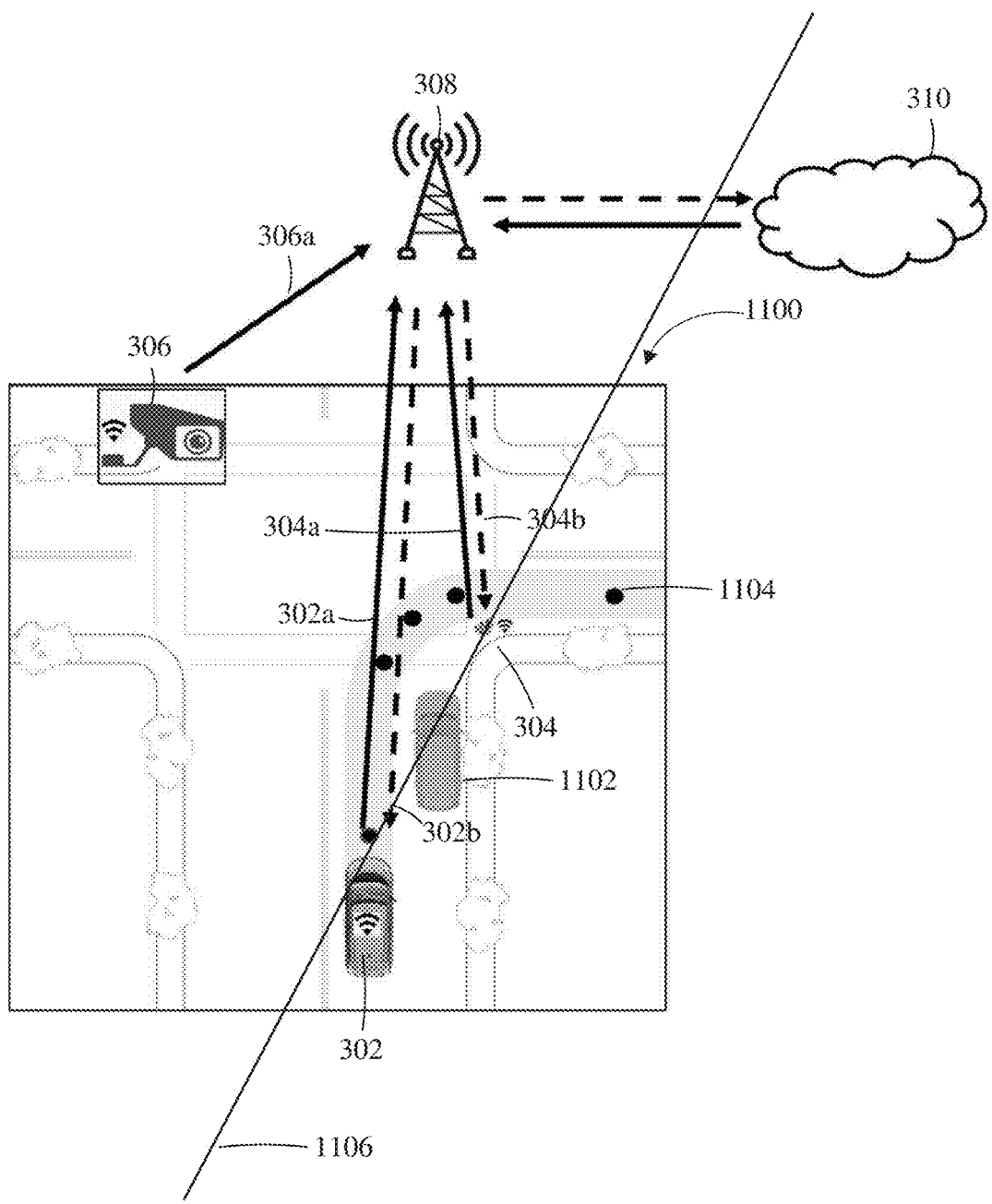
FIG. 11 is a diagram of a four-way intersection used to explain how to perform conflict detection in the presence of an occluded road user.

In general, an infrastructure sensor, such as the infrastructure camera 306, if a RSU may detect positions of all road users, including dynamic connected and non-connected road users, at an intersection on a two-dimensional (2D) plane such as shown by example in the intersection 1100 of FIG. 11. The road users may include pedestrians, bicyclists, cars, trucks, etc., also referred to as dynamic obstacles. The RSU can perceive the environment around the intersection, such as static obstacles (buildings, infrastructure, parked vehicles), in addition to the dynamic obstacles. As explained initially, this can include positions, shapes, and dimensions, among other information, for each obstacle.

In general, once the obstacles and positions are known, a determination can be made as to whether an occlusion between two objects exists by checking if a line-of-sight between two objects is blocked by static or dynamic obstacles. The conflict warning can then be targeted for the occluded road users.

Specifically, and referring to the example of FIG. 11, the road users include the connected vehicle 302 and the pedestrian 304 as moving obstacles. Another road user is a parked vehicle 1102. An intended path of the connected vehicle 302 is shown by the waypoints 1104. The intended path may be determined using the signal INTENT as described above. To check if a road user is occluded to another road user, positions of each are identified. Thereafter, a straight-line segment between the two positions is computed. In FIG. 11, the straight-line segments 1106 extends beyond the two initial positions of the connected vehicle 302 and the pedestrian 304 for clarity.

Whether the computed line segment, such as the line segment 1106 in this example, intersects any other moving or stationary obstacle at the intersection determines whether a road user is occluded to another road user. In FIG. 11, for example, the pedestrian 304 is labeled as occluded to the connected vehicle 302 because there is an intersection between the stationary (parked) vehicle 1102 and the line segment 1106. Targeted notifications can then issue to the connected vehicle 302, the pedestrian 304, or both. The process can be repeated over time using updated positions of the road users and line segment(s).

To minimize notifications, a notification can be omitted when there is a clear line-of-site (e.g., no intersection between a line segment and an obstacle). In some implementations, the notification may still issue, as described previously, when a target deceleration is exceeded in the event of a potential conflict. With this occlusion model, the conflict warnings can be more targeted to occluded road users. These targeted warnings can increase usability of a conflict warning system.

Figure 12A:
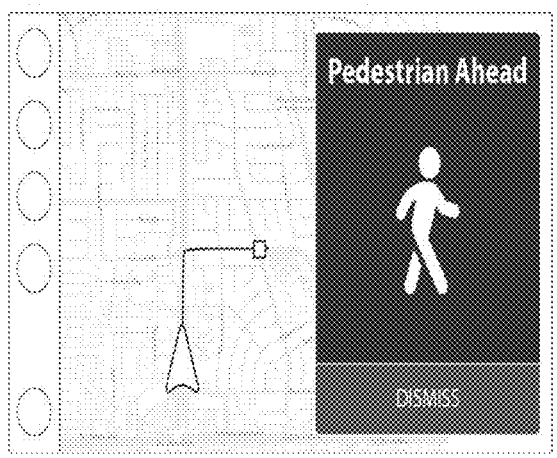
FIG. 12A is an example of a notification issued to a connected vehicle from conflict detection according to the teachings herein.
Figure 12B:
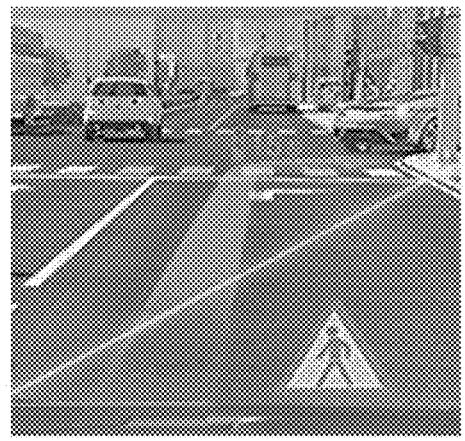
FIG. 12B is another example of a notification issued to a connected vehicle from conflict detection according to the teachings herein.
Figure 12C:
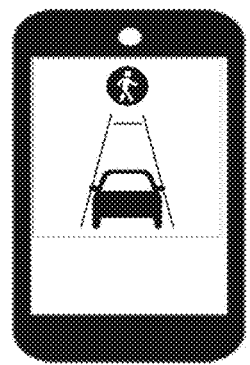
FIG. 12C is an example of a notification issued to a pedestrian from conflict detection according to the teachings herein.

FIGS. 12A-12C show examples of notifications that may issue when a conflict is detected, such as by the conflict detection module 316 or a processor of a RSU. In the example of FIG. 11, either the conflict detection module 316 or a processor of the RSU may determine that there is a potential conflict between the connected vehicle 302 and the pedestrian 304 within the intersection 1100. In each of these examples, the connected vehicle 302 is projected to take a right turn at the intersection, and the pedestrian 304 is on the sidewalk adjacent to the road or crossing the road after the right turn.

FIG. 12A is an example of a notification, such as the notification 302b, issued to the connected vehicle from the conflict detection module 316 of FIG. 3. This notification is a map display notification that shows, to the left, the possible path through the intersection and the relationship of the pedestrian to the path and, to the right, the notification that there is a pedestrian ahead. FIG. 12B is another example of a notification for the same conditions using a heads-up display. Each of these notifications may be issued to the operator of the connected vehicle using the cellular network. The third example of FIG. 12C uses a cellular network connection between the MEC 310 and a mobile phone. It is possible to use the example of FIG. 12C to provide the notification 302b to the connected vehicle 302. However, this is less desirable than using the examples of FIGS. 12A and 12B to notify the connected vehicle 302. The example of FIG. 12C is preferably used to issue a notification, such as the notification 304b, to a pedestrian 304 from the conflict detection module 316 of FIG. 3.

The technique illustrated by FIG. 11 does not rely on perception data from vehicles, although such perception data can be used as described above with regards to the MEC 310. Instead, the occlusion model can use only detection from an infrastructure sensor, such as at a RSU, along with basic geometry/physics. Thus, the technique may be applied generally to all road users. In some implementations, unoccluded road users may be filtered before potential conflicts between road users are determined. By such filtering, the computations necessary to check conflicts between road users can be reduced.

In the above description, an unlimited view angle from a road user of interest (e.g., an ego vehicle such as the connected vehicle 302). In general, occlusion is determined if the line-of-sight is being blocked by obstacles. Instead of simply assuming an unlimited view angle from the vehicle, line-of-sight may be further limited to a specific range of angles in some implementations. For example, the range of angles may depend upon models of human driver view angles. The range of angles can be limited to +60 degrees to −60 degrees from the heading of the vehicle.

In implementations where the line-of-sight is limited, the human driver view angles may be more precisely determined with eye tracking sensors. Occlusion detection can be more precise if eyes can be tracked with in-vehicle sensors and shared with the RSU or the MEC 310. In an example, the direction of the operator's gaze relative to the heading of the vehicle may be measured and transmitted using wireless communications, such as cellular communications. The processor of the RSU or the MEC 310 may infer the range of angles for the line-of-sight by the relative angle and the heading angle of vehicle. In some implementations, eye tracking may sense the direction of the gaze relative to the heading of the vehicle on a continuous or periodic basis, and the inference of the range of angles may be similarly updated.

In some implementations, a human view angle model may be omitted or supplemented. That is, the above relies on the ability to infer the line-of-site based on a (e.g., world) model using observations made by the infrastructure sensor(s) at an intersection. In practice, technical limitations of the sensor(s) may result in a model insufficient to detect all occlusions or filter non-occlusions. Instead of or in addition to the sensor data, what a human driver or operator can see may be based on perception data of the on-board sensors. If the vehicles have on-board sensors and can share perception data from the on-board sensors, then the occlusion detection can be further improved with a more precise angle of view from the vehicle by integrating the observations from the on-board sensors.

While the occlusion detection is described for targeting warnings to operators of vehicles, the occlusion detection can also be useful for automated vehicles to increase situational awareness around or in an intersection.

According to some aspects of the teachings herein, a system for intersection collision avoidance can include a processor. The processor can comprise a shared world model configured to receive signals from at least two road users in proximity to an intersection within a vehicle transportation network, wherein the at least two road users include an ego vehicle and the shared world model is an output of a shared world model generation system. The shared world model generation system includes an object association module that associates location information within respective messages forming the signals with a respective sensed object over time and an object fusion module configured to, where at least two sensed objects correspond to the same road user, merge data of the at least two sensed objects to identify a location of the same road user. Processing by the object association module is decoupled from processing by the object fusion module such that a speed of generation of the shared world model is limited by a fastest sensor providing the signals as opposed to a slowest sensor providing the signals. The processor can also comprise a conflict detection module that receives object information from the shared world model, detects a potential future collision between the ego vehicle and another road user of the at least two road users, and transmits a notification of the potential future collision to the ego vehicle.

In certain variations of this system, the signals from the at least two road users comprise asynchronous signals received at a perception and filter module of the shared world model generation system, the perception and filter module produces unsynchronized detections of objects from the asynchronous signals and transmits the unsynchronized detections to the object fusion module concurrently with transmitting the unsynchronized detections to interpolators of the shared world model generation system, and the interpolators, using the unsynchronized detections, generate synchronized outputs for the respective objects to each of the object association module and the object fusion module.

In certain variations of this system, the signals from the ego vehicle include an intent signal including a set of drive goals, and the intent signal is generated based on at least one of a status of a turn signal of the ego vehicle or a destination setting of the ego vehicle.

In certain variations of this system, the conflict detection module receives the intent signal and detects the potential future collision using the intent signal.

According to some aspects of the teachings herein, a system for intersection collision avoidance can include a processor. The processor can be configured to receive first signals identifying a location of a first road user in proximity to an intersection within a vehicle transportation network, wherein the first road user is an ego vehicle that is connected to a cellular network, receive second signals identifying a location of a second road user in proximity to the intersection, wherein the second road user is a non-motorized road user, receive at least one of a status of a turn signal of the ego vehicle or a destination setting of the ego vehicle, define a conflict zone for the intersection, wherein the conflict zone is an area of the intersection where non-motorized road users are more likely to conflict with motorized road users, generate, using the first signals and the at least one of the status of the turn signal of the ego vehicle or the destination setting of the ego vehicle, an intended path for the ego vehicle to cross the zone, detect a potential future collision between the ego vehicle and the non-motorized road user based on the ego vehicle and the non-motorized road user crossing any point of the zone at a same time in a look-ahead period, and transmit a notification of the potential future collision to the ego vehicle over the cellular network.

In certain variations of this system, the non-motorized road user is a pedestrian.

In certain variations of this system, the processor can be configured to can transmit a notification of the potential future collision to the non-motorized road user.

In certain variations of this system, the processor can be configured to receive third signals identifying a location of a third road user in proximity to the intersection, wherein the third road user is a motorized road user not connected to the cellular network, generate, using the third signals, a predicted path for the third road user to cross the zone, and detect whether the third road user crosses the zone at a same time in the look-ahead period as the ego vehicle and the non-motorized road user.

According to some aspects of the teachings herein, a system for intersection collision avoidance can include a processor. The processor can be configured to receive first signals identifying, for a first road user, a path through an intersection within a vehicle transportation network, wherein the first road user is an ego vehicle that is connected to a cellular network, compare a combination of an entering lane and an exiting lane of the path to a database storing a combination of an entering lane and an exiting lane of the intersection, identify the path as being a path requiring a notification process different from a standard notification process based on the combination of the path matching the combination of the intersection, receive second signals identifying a location of a second road user in proximity to the intersection, wherein the second road user is a non-motorized road user, and transmit, over the cellular network, a notification to the ego vehicle of a presence of the second road user according to the notification process and the location of the second road user.

In certain variations of this system, the non-motorized road user is a pedestrian.

In certain variations of this system, the system includes a road side unit supporting a infrastructure sensor and housing the processor.

In certain variations of this system, the path is an intended path based on at least one of a turn signal or a destination of the first road user.

According to some aspects of the teachings herein, a system for intersection collision avoidance can include a processor. The processor can be configured to receive first signals identifying a location of a first road user in proximity to an intersection within a vehicle transportation network, wherein the first road user is an ego vehicle that is connected to a cellular network, receive second signals identifying a location of a second road user in proximity to the intersection, define a straight-line segment between the first road user and the second road user in a two-dimensional plane, determine whether the straight-line segment intersects an obstacle between the first road user and the second road user, and where the straight-line segment intersects the obstacle, transmit a notification of a presence of the second road user as occluded to the first road user over the cellular network.

In certain variations of this system, the system includes a road-side unit including an infrastructure sensor, and the processor is coupled to the infrastructure sensor and the first signals and the second signals are generated by the infrastructure sensor.

In certain variations of this system, the processor is configured to, where the straight-line segment intersects the obstacle, transmit the notification of the presence of the second road user as occluded to the second road user over the cellular network.

Herein, the terminology "passenger", "driver", or "operator" may be used interchangeably. As used herein, the terminology "processor", "computer", or "computing device" includes any unit, or combination of units, capable of performing any method, or any portion or portions thereof, disclosed herein.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special-purpose processor or circuitry that may include specialized hardware for carrying out any of the methods, algorithms, aspects, or combinations thereof, as described herein. In some implementations, portions of the instructions may be distributed across multiple processors on a single device, or on multiple devices, which may communicate directly or across a network, such as a local area network, a wide area network, the Internet, or a combination thereof.

As used herein, the terminology "example," "embodiment," "implementation," "aspect," "feature," or "element" indicate serving as an example, instance, or illustration. Unless expressly indicated otherwise, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise or clearly indicated otherwise by the context, "X includes A or B" is intended to indicate any of the natural inclusive permutations thereof. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of operations or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and/or elements.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A system for intersection collision avoidance, comprising:
 a cellular transceiver for a cellular network; and
 a processor located at a cellular access point for multi-access edge computing, the processor comprising:
  a shared world model configured to receive, by the cellular transceiver, signals relating to at least two road users in proximity to an intersection within a vehicle transportation network, wherein the at least two road users include an ego vehicle, and the signals conform to a standards-based communication protocol, and wherein the shared world model is configured to determine objects from the signals, fuse objects detected by multiple sources, and generate a single world view comprising object information relating to the objects; and
  a conflict detection module configured to receive the object information from the shared world model, determine a potential future collision between the ego vehicle and an other road user of the at least two road users, and transmit a notification of the potential future collision to the ego vehicle over the cellular network.

2. The system of claim 1, wherein the standards-based communication protocol comprises SAE 2735.

3. The system of claim 1, wherein the other road user is a non-motorized road user, and the conflict detection module is configured to:
 transmit, over the cellular network, a notification of the potential future collision to a cellular-enabled device supported by the other road user.

4. The system of claim 1, wherein the signals include an intent signal comprising at least one of a direction indicated by a turn signal of the ego vehicle or a destination setting of the ego vehicle, and the signals are transmitted to the cellular transceiver using SAE 2735.

5. The system of claim 4, wherein the intent signal is received as an encoded signal converted from a JSON string generated by the ego vehicle, and the system comprises:
 a signal interface that receives the encoded signal from the cellular transceiver and converts the encoded signal to a format usable by the processor.

6. The system of claim 1, wherein:
 the signals include an intent signal comprising at least one of a direction indicated by a turn signal of the ego vehicle or a destination setting of the ego vehicle, and
 the shared world model is configured to determine an intended path for the ego vehicle and supply the intended path to the conflict detection module a part of the object information.

7. The system of claim 6, wherein the shared world model is configured to:
 generate, where the direction of the turn signal is received, a possible intended path for the ego vehicle relative to the intersection using a high-definition map and the direction indicated by the turn signal;

generate, where the destination setting is received, a possible intended path for the ego vehicle relative to the intersection using the high-definition map and the destination setting;

where the direction indicated by the turn signal and the destination setting are each received:
compare the direction indicated by the turn signal to the possible intended path generated using the high-definition map and the destination setting; and
select, based on a result of the compare, the intended path for the ego vehicle as either the possible intended path generated using the high-definition map and the destination setting or the possible intended path generated using the high-definition map and the direction indicated by the turn signal; and transmit, to the conflict detection module, a set of drive goals for the ego vehicle relative to the intersection that conform to the intended path.

8. The system of claim 7, wherein to select the intended path comprises to:
select the possible intended path generated using the high-definition map and the destination setting as an intended path for the ego vehicle where the direction matches the possible intended path generated using the high-definition map and the destination setting; and
select the possible intended path generated using the high-definition map and the direction as the intended path for the ego vehicle where the direction does not match the possible intended path generated using the high-definition map and the destination.

9. The system of claim 7, wherein the processor is configured to:
select, where the direction indicated by the turn signal is received and the destination setting is not received, the possible intended path generated using the high-definition map and the direction as the intended path for the ego vehicle; and
select, where the direction of the turn signal is not received and the destination setting is received, the possible intended path generated using the high-definition map and the destination setting as the intended path for the ego vehicle.

10. The system of claim 1, wherein:
the shared world model is configured to determine an intended path for the ego vehicle and supply the intended path to the conflict detection module with the object information as a set of drive goals, and
the conflict detection module receives the set of drive goals and determines the potential future collision using the set of drive goals.

11. The system of claim 1, wherein:
the shared world model is configured to receive, at the cellular transceiver, signals from an infrastructure sensor that monitors at least a portion of the intersection, and
the signals from the infrastructure sensor conform to the standards-based communication protocol.

12. The system of claim 11, wherein:
the shared world model is configured to determine, for a look-ahead period, a predicted path for each of the at least two road users using the signals relating to the at least two road users,
the signals relating to the at least two road users comprise signals received from the ego vehicle and the signals from the infrastructure sensor.

13. The system of claim 1, wherein the processor is configured to control the cellular transceiver to transmit, to a shared world model of an autonomous vehicle in proximity to the intersection, the signals relating to the at least two road users over the cellular network.

14. The system of claim 1, wherein:
the shared world model is configured to determine a predicted path for the ego vehicle using at least some of the signals;
the predicted path passes through the intersection;
the signals identify a location of a non-motorized road user of the at least two road users; and
the conflict detection module is configured to:
compare a combination of an entering lane and an exiting lane of the predicted path to a database storing a combination of an entering lane and an exiting lane of the intersection;
identify whether the predicted path is a path requiring a notification process different from a standard notification process based on the combination of the predicted path matching the combination of the intersection;
transmit the notification to the ego vehicle of a presence of the non-motorized road user according to the notification process and the location of the non-motorized road user where the predicted path is the path requiring the notification process different from the standard notification process; and otherwise,
determine whether the standard notification process indicates a notification to the ego vehicle of the presence of the non-motorized road user according to the location of the non-motorized road user.

15. The system of claim 14, wherein the non-motorized road user carries a cellular device, and the conflict detection module is configured to:
transmit, over the cellular network and to the cellular device, a notification to the non-motorized road user of a presence of the ego vehicle according to the location of the non-motorized road user.

16. A method for intersection collision avoidance, comprising:
receiving, by a cellular transceiver for a cellular network, signals at a shared world model relating to at least two road users in proximity to an intersection within a vehicle transportation network, wherein the at least two road users include an ego vehicle, and the signals conform to a standards-based communication protocol;
receiving object information from the shared world model at a conflict detection module;
determining, by the conflict detection module, a potential future collision between the ego vehicle and an other road user of the at least two road users; and
transmitting, by the conflict detection module, a notification of the potential future collision to the ego vehicle over the cellular network, wherein the shared world model and the conflict detection module are implemented by a processor located at a cellular access point for multi-access edge computing, wherein the cellular access point is located at a cell tower.

17. The method of claim 16, wherein receiving the signals comprises:
receiving first signals identifying a location of the ego vehicle; and receiving second signals identifying a location of the other road user, wherein the other road user is a non-motorized road user, and the method comprising:

generating, by the shared world model, the object information comprising:

generating, using the first signals, a predicted path for the ego vehicle; and generating, using the second signals, a predicted path for the other road user; and defining, by the conflict detection module, a hazard zone for the intersection, wherein:

the hazard zone is an area of the intersection where non-motorized road users are more likely to conflict with motorized road users, and determining the potential future collision between the ego vehicle and the other road user comprises determining the potential future collision based on the predicted path of the ego vehicle and the predicted path of the other road user crossing any point of the hazard zone at a same time in a look-ahead period.

18. The method of claim 16, wherein the other road user is a non-motorized road user, and the method comprising:

transmitting, over the cellular network, a notification of the potential future collision to a cellular-enabled device supported by the other road user.

19. The method of claim 16, wherein receiving the signals comprises receiving sensor data from an infrastructure sensor that monitors at least a portion of the intersection, and wherein the infrastructure sensor is housed by a road-side unit.

20. The method of claim 16, wherein receiving the signals comprises:

receiving, from at least one of the ego vehicle or an infrastructure sensor that monitors at least a portion of the intersection, signals identifying a location of the ego vehicle; and receiving, from at least one of a cellular device supported by a non-motorized road user of the at least two road users or the infrastructure sensor, signals identifying a location of the non-motorized road user, and the method comprising:

defining, using the location of the ego vehicle and the location of the non-motorized road user, a straight-line segment between the ego vehicle and the non-motorized road user in a two-dimensional plane;

determining that the straight-line segment intersects an obstacle between the ego vehicle and the non-motorized road user; and transmitting, to the ego vehicle, a notification that the non-motorized road user is occluded responsive to the determining.

* * * * *